(12) United States Patent
Smith et al.

(10) Patent No.: US 12,102,027 B2
(45) Date of Patent: Oct. 1, 2024

(54) SYSTEM AND METHOD FOR PRESCRIPTIVE SEED TREATMENT

(71) Applicant: Inflexion Point Technologies, LLC, Urbandale, IA (US)

(72) Inventors: Steven P. Smith, Ankeny, IA (US); Nicholas M. Iwig, Urbandale, IA (US); Mark M. Iwig, Johnston, IA (US); Pat Parks, Ankeny, IA (US)

(73) Assignee: INFLEXION POINT TECHNOLOGIES, LLC, Urbandale, IA (US)

( * ) Notice: Subject to any disclaimer, the term of this patent is extended or adjusted under 35 U.S.C. 154(b) by 167 days.

(21) Appl. No.: 15/739,606

(22) PCT Filed: Jun. 23, 2015

(86) PCT No.: PCT/US2015/037230
§ 371 (c)(1),
(2) Date: Dec. 22, 2017

(87) PCT Pub. No.: WO2016/209217
PCT Pub. Date: Dec. 29, 2016

(65) Prior Publication Data
US 2018/0192577 A1    Jul. 12, 2018

(51) Int. Cl.
*A01C 1/06* (2006.01)
*A01C 7/20* (2006.01)
(Continued)

(52) U.S. Cl.
CPC .................. *A01C 1/06* (2013.01); *A01C 7/20* (2013.01); *A01C 21/005* (2013.01); *A01C 2001/048* (2013.01)

(58) Field of Classification Search
None
See application file for complete search history.

(56) References Cited

U.S. PATENT DOCUMENTS 3,848,772 A    11/1974  Aanestad et al.
4,356,934 A *  11/1982  Knake ...................... A01C 1/06
                                                 47/DIG. 9
(Continued)

FOREIGN PATENT DOCUMENTS

WO    8808244 A1    11/1988

OTHER PUBLICATIONS

European Patent Office; "European Search Report (EESR)", PCT/US2015/037230, Mar. 20, 2019, 12 pages.
(Continued)

*Primary Examiner* — Mandy C Louie
(74) *Attorney, Agent, or Firm* — Goodhue, Coleman & Owens, P.C.

(57) ABSTRACT

An improved method for prescriptive seed treatment is provided. A location can be calculated where a combination of seed and one or more types and/or amounts of seed-applied substances will be planted. The combination is selected, based at least in part, on one or more conditions. The combination is generated prior to being planted. The method can further include selecting a type of seed and/or a type and/or amount of the one or more seed-applied substances to be applied. One or more applicators can apply the seed-applied substance(s) to the seed within a seed flow path during operation. A plurality of seed receptacles can contain different combinations of seed and/or seed-applied substances generated prior to being placed into the receptacles. The method could further include selecting a seed receptacle containing a selected combination, and delivering the selected combination from the selected seed receptacle to be planted by the planter.

19 Claims, 16 Drawing Sheets

(51) Int. Cl.
*A01C 21/00* (2006.01)
*A01C 1/04* (2006.01)

(56) References Cited

U.S. PATENT DOCUMENTS

| | | | | |
|---|---|---|---|---|
| 5,915,313 | A * | 6/1999 | Bender | A01B 79/005 111/178 |
| 5,931,882 | A * | 8/1999 | Fick | A01C 23/007 172/4 |
| 5,956,255 | A | 9/1999 | Flamme | |
| 6,112,679 | A * | 9/2000 | Borstmayer | A01C 1/06 111/173 |
| 6,148,748 | A * | 11/2000 | Bardi | A01C 7/081 111/905 |
| 6,216,615 | B1 * | 4/2001 | Romans | A01C 7/04 111/177 |
| 7,869,902 | B2 * | 1/2011 | Hunter | A01C 1/00 700/240 |
| 2002/0104262 | A1 * | 8/2002 | Muhr | A01C 1/06 47/57.6 |
| 2008/0202398 | A1 * | 8/2008 | Wilkerson | A01C 7/06 111/118 |
| 2012/0115911 | A1 * | 5/2012 | Ochampaugh | A01C 1/08 514/341 |
| 2012/0183675 | A1 * | 7/2012 | Reineccius | A01C 1/00 427/4 |
| 2013/0121101 | A1 * | 5/2013 | Ochampaugh | B01F 15/0227 366/141 |
| 2015/0059629 | A1 * | 3/2015 | Kinzenbaw | A01C 7/044 111/200 |
| 2015/0223391 | A1 * | 8/2015 | Wendte | A01C 7/04 111/177 |
| 2015/0250091 | A1 * | 9/2015 | Aanestad | A01C 1/06 111/200 |
| 2017/0049044 | A1 | 2/2017 | Stoller et al. | |

OTHER PUBLICATIONS

International Search Report and Written Opinion of PCT/US15/37230 (Sep. 16, 2015).
Canada Intellectual Patent Office; "Examination Report", 3,028,351, Aug. 10, 2021, 5 pages.
Europe Patent Office, Extended Search Report, EP 21204703.9, Jan. 26, 2022, 14 Pages.

* cited by examiner

SYSTEM AND METHOD FOR PRESCRIPTIVE SEED TREATMENT

FIELD OF THE DISCLOSURE

The present disclosure relates generally to a prescriptive seed treatment system and method. More particularly, but not exclusively, the present disclosure relates to selecting and planting prescriptively treated seed (e.g., seed treated with a prescriptive type, amount, and/or mixture of substance(s) based at least in part on past, current, and/or predicted field and/or market conditions).

BACKGROUND OF THE DISCLOSURE

Modernized farming practices employ an array of agricultural tools and techniques. One common technique is treating seeds with certain substances (typically an insecticide, nutrients, fungicide, inoculant, nematicide and/or other plant growth or health substance) prior to planting them. The seed treatment can help farmers in many ways, including by improving plant yield through disease, nematode, insect and/or other pest protection, tolerance, resistance and/or prevention, and/or improved early season plant growth, health and/or vigor. Many believe that early growth is critical to optimizing yield, such that controlling the conditions around the seed during germination and/or the early growth period is often valued.

However, efforts in soil conservation have led to an increase in no-till or low-till farming, whereby the soil generally remains undisturbed through tillage. The technique often leads to reduced soil temperature and increased soil moisture and field residues with associated elevated levels of disease inoculum, weeds and pests, paradoxically increasing the need for and value of seed treatment.

Similarly, farmers are subject to the dynamic nature of commodity pricing encountered in agriculture. For example, many farmers are rent-based farmers that do not own the land on which they farm. As a result, such farmers are especially sensitive to returning a profit in any given year. Further, huge negative swings in commodity prices can cause farmers who own their land to no longer afford to continue farming as a living. Accordingly, farmers often only plant crops that provide the highest projected net income for a given year. Because certain crops (e.g., corn in the corn belt in the United States) often consistently have the highest projected return on investment in certain areas, farmers often practice monoculture (i.e., planting the same crop each year) and/or do not frequently rotate crops. The absence of regularly rotating crops often takes a great toll on the soil, resulting in increased levels of diseases, weeds and/or pests and again increasing the need for and value of prescriptively treating seed.

In current practice, seed treatment substances are often applied well prior to planting. For example, seed companies often treat most corn seed and significant amounts of soybean, and other seed prior to being bagged. By treating their seeds upstream prior to bagging them, seed companies have generated significant additional revenues beyond just the seed itself. The revenue generated by such seed companies is so significant that many of them have invested millions of dollars in seed treatment equipment in their seed production, bagging and/or other facilities to maximize the efficiency and/or profitability of this product line. However, treating seeds prior to bagging them is deficient in several respects. For example, the greater the elapsed time between application of the substances to the seed and planting of the same can decrease the potency of the substances, particularly in the cases of biocides. Additionally, pretreated seed are often treated with a seed treatment substance based on common pests or other targets across many regions and/or what is most profitable for the seed companies and/or others in the seed supply chain rather than factors relevant to a particular farmer when planting a particular field. While sometimes seeds can be pretreated based on parameters relevant at the time of treatment, they still may not be relevant at the time of planting. Thus, the time between treatment and planting can further minimize the applicability or relevance of the seed treatment substance. Therefore, a need exists in the art for a system that can maintain the ability to use chemical and other seed treatment substances in a manner that better maintains their potency and is tailored to the needs of a particular farmer planting a particular field at a particular time under particular conditions.

Some soybean and other seeds are treated downstream in the seed supply chain (e.g., at a distributor, retailer or sales representative). These downstream entities also have expended significant amounts of investment in labor, logistics and equipment to be able to deliver these downstream seed treatments.

Regardless of where the seeds are treated, as referenced above, the current practice in the seed industry is to treat seeds in large batches using the same treatment materials for the entire batch. While this is more efficient and profitable for the upstream and downstream applicators, it is deficient in several respects. For example, upstream and downstream treatment decisions often overlook what combination of seed and treatment is best suited for particular farmers, and farmers often are not satisfied with the amount of seed treatment choices they have available to them for purchase. Similarly by way of example, batch application of substances can sometimes result in uneven distribution of the same within the batch, and can sometimes further result in shedding and even loss of the applied substances as the seeds collide with one another due to vibration and the like. By way of further example, batch application prior to bagging limits the ability for seed companies to tailor the combination of seed and seed treatment to the particular planting conditions where a particular seed or group of seeds will be planted.

Currently, most seed treatment substances are chemicals. Despite the benefits of chemical seed treatment substances, the bulk application of chemicals to an agricultural field can have unintended and/or negative consequences. With the growing emphasis on safety, health, environmental and sustainability issues, concerns exist about runoff and dust off or drift from chemical biocides (e.g., herbicides, insecticides, nematicides, fungicides, and the like) and potential damage to non-target organisms. Therefore, a need exists in the art for a method and system for treating seed that could reduce the aggregate amount of seed treatment chemicals deployed in a field.

Along these lines, significant amounts of research and development investments are currently being allocated to biological alternatives to agricultural chemicals. However, many biological alternatives have a significantly shorter shelf life than chemical alternatives. For example, most chemical seed treatments and even some biological seed treatments are durable enough to enable the aforementioned industry practice of pre-bagging batch treatment by seed companies several months prior to planting. However, some biological alternatives are not very durable and/or have shelf lives that can require treatment to occur a few days, hours or even minutes prior to planting. Because of these and other industry practices, many of these less durable biological alternatives are often used sub-optimally or do not even get commercialized. Thus, a need exists in the art for a system to enable deployment of a broader range of biological and other non-durable seed treatment materials much closer to or during planting, including a need to be able to apply less durable substances to the seed during the planting operation.

However, despite these significant investments, biological research and development takes significant time and resources. Thus, it is unlikely that biological seed treatment alternatives will completely replace chemical seed treatment substances. Therefore, a need exists in the art for a system that can enable use of a broader range of biological and/or other less durable seed treatment substances while also improving the ability to use chemical seed treatment substances.

Two agricultural industry trends in North America (consolidation of farm ownership and rising input costs) are noteworthy here. As farm owners gain more and more land, farm management practices often get more and more sophisticated. Similarly, input costs (e.g., seed and seed treatment costs) often rise, sometimes significantly. Partly as a result of rising input costs, some of the larger and more sophisticated farm operators have started demanding the ability to use only those inputs that are best suited for their fields. However, as described above, the industry's batch, prebagging treatment and other practices have been a roadblock to meeting demand for prescriptive seed treatments. Therefore, based in part on the dynamic, and generally increasing, prices of seed treatments and other inputs, a need exists in the art to enable farm operators to better utilize their seed treatment resources (e.g., by using types and amounts of seed treatment substances suited for their particular field conditions), including a need to reduce the quantity of or at least better tailor the use of seed treatment substances and labor expended.

Furthermore, conditions during planting are often dynamic, which only further enhances the need for prescriptive seed treatment. For example, the typical industry practice is for farm operators to load a pre-treated batch of seeds into the planter's seed bins the day before planting so that the farm operator can immediately begin planting first thing the next morning. If for any reason, such as adverse weather, a farmer is unable to plant in the desired field on the anticipated day, the farm operator is often forced to choose between not planting all the seeds loaded the prior day or planting the pre-loaded seeds in a different field where the conditions resulting from adverse weather are better for planting. If the farm operator chooses the former, it often results in negative yield performance due at least in part to fewer effective growing days. Conversely, if the farmer chooses the latter, it also often results in a negative yield performance, especially if the non-adverse weather-related field conditions make the combination of seed and seed treatment not well suited for a field other than the originally intended field. As a result, a need in the art exists for a system whereby a farmer can pre-load its seed into a planter prior to planting day to optimize its amount of time planting on planting day and still have the ability to adapt to dynamic weather and other conditions that may occur on planting day.

Moreover, the optimal type and amount of seed treatment substances often varies from field to field, row to row, and even seed planting location to seed planting location. In particular, the field and other conditions can vary greatly across fields, rows and seed planting locations. To that end, farmers have adopted tools and techniques such as variable rate planters, variable blend and variable rate fertilizers, multi-hybrid and multi-variety planters (i.e., planters capable of planting multiple, different types of hybrids during the same planting session), and the like. Thus, a need exists in the art for a prescriptive seed treatment that permits precise selection of which seed and the type and amount of seed treatment substances that should be planted in a particular location, including a need for being able to select immediately prior to or during planting operation, a combination of seed and seed treatment well suited for the location where and the timing when the seed is to be planted based, at least in part, upon historic, current, predictive and/or other field and/or other planting conditions.

Notably, current prescriptive agriculture systems and methods do not contemplate prescriptively treating seeds during planting. For example, in furrow fertilizer application systems often damage seeds that come into direct contact with the fertilizer. Thus, in furrow fertilization application systems typically include some mechanism to ensure the fertilizer is applied in the furrow in a location where it does not come into contact with any seed. Thus, a need exists in the art for a prescriptive seed treatment where the seed together with the seed treatment substance are planted in the same location, including where the seed treatment substance not only can come into direct contact with, but also is intentionally applied to the seed prior to the seed being planted into the field.

Further, recent trends relating to environmental, safety, health, sustainability and other similar concerns have received increased recognition from those both inside and outside of the industry. As a result, governmental, non-profit and other organizations have pushed to reduce negative dust off, non-target or other safety, health, environmental or other sustainability impacts that may result from planting seeds with seed-applied substances. For example, abrasion of seed treatment products or dust off can occur during seed packaging, seed transport, planter loading, movement in planters across the field and otherwise during the planting operation. Some have suggested that dust off from loading seeds that have been pre-treated with neonicotinoid and/or other seed treatments could have a negative impact on the health of bees and other important insects. However, some seed and chemistry companies and other industry participants have suggested that neonicotinoid seed treatments can result in potentially strong yield and/or other benefits, such that their continued use is important to the industry. Thus, a need exists in the art for a system that can minimize the amount of dust-off resulting from seed treatment substances while a farm operator loads its seeds onto a planter and plants those seeds, including a need to enable the potential benefit of neonicotinoid seed-applied substances in a manner that can reduce the potential harm from dust off.

SUMMARY

It is therefore a primary object, feature, and/or advantage of the present disclosure to improve on or overcome the deficiencies in the art.

In an aspect of the present disclosure, a method for prescriptive seed treatment is disclosed that prescriptively selects, based at least in part on one or more conditions, a combination of seed and one or more types and/or amounts of seed treatment substances to be planted together at a particular location.

According to an aspect of the present disclosure, the method for prescriptive seed treatment includes providing a planter, one or more seeds and one or more seed-applied substances, selecting, based at least in part on a condition, a combination of seed and seed-applied substance to plant at a calculated location, generating the combination and planting it.

According to an aspect of the invention, the selection can take place by selecting one or more types and/or amounts of seed-applied substances to be applied to seed, and the combination can be generated by delivering the selected type(s) and amount(s) of the seed applied substance(s) through a substance flow path to a substance applicator that applies the seed-applied substances to the seed within the seed flow path.

According to an aspect of the invention, the combination can also be generated by placing different combinations of seeds and/or seed-applied substances into at least two of a plurality of seed receptacles, selecting a seed receptacle containing the selected combination and delivering the combination from the selected seed receptacle so it can be planted by the planter.

In another aspect of the present disclosure, a method for seed treatment on a planter is provided. According to the method, a planter with a seed receptacle, a substance receptacle with a seed-applied substance, a substance flow path, a seed flow path and a controller are provided. The controller can, based at least in part on one or more conditions, determine one or more amounts of seed-applied substances to be applied to the seed during the planting operation, and those amounts of substances are transferred from the substance receptacle through the substance flow path. The seed is transferred from the seed receptacle into the seed flow path, and the selected amount(s) of the seed-applied substance(s) is(are) applied to the seed within the seed flow path.

BRIEF DESCRIPTION OF THE DRAWINGS

Illustrated embodiments of the disclosure are described in detail below with reference to the attached drawing figures, which are incorporated by reference herein, and where.

DETAILED DESCRIPTION

Figure 1A:
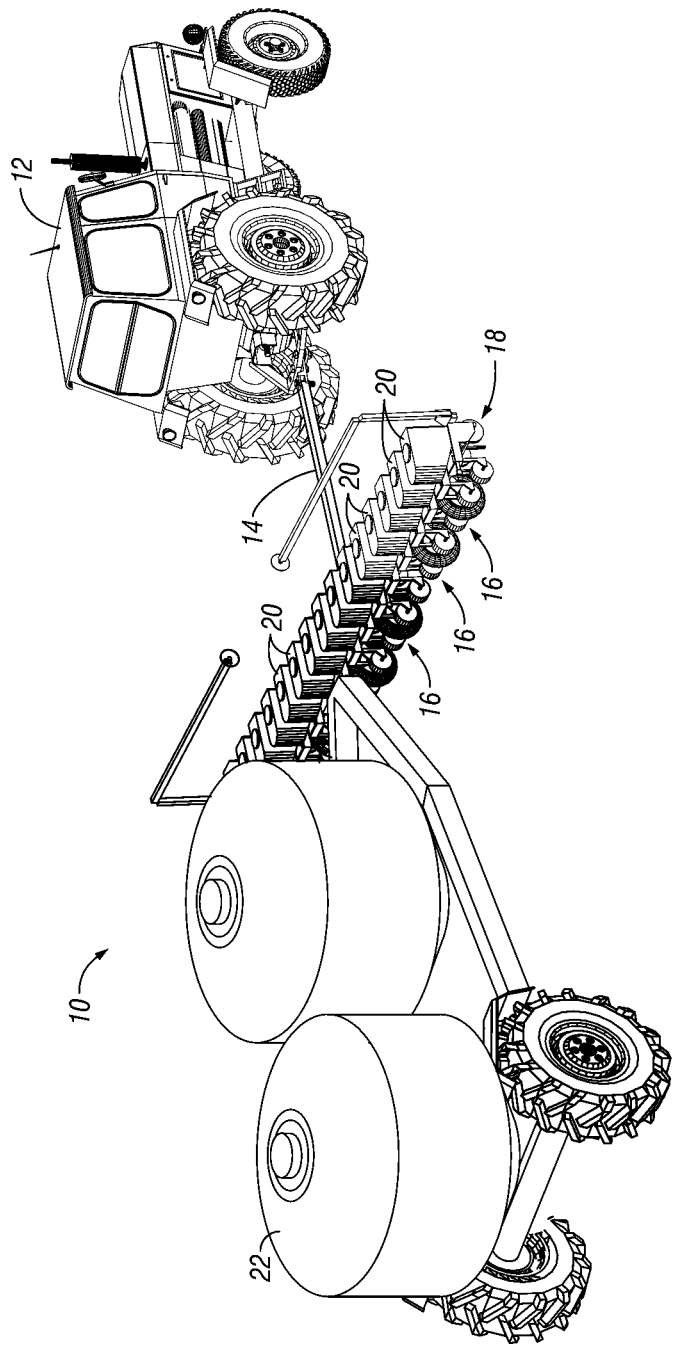
FIG. 1A is a front perspective view of a planter implement system in accordance with an illustrative embodiment.

The present disclosure contemplates many different methods and structures used to select a combination of seed and seed-applied substances to be planted at a particular location. Representative applications of methods and apparatus according to the present application are described in this section. These examples are being provided solely to add context and aid in the understanding of the described embodiments. It will thus be apparent to one skilled in the art that the described embodiments may be practiced without some and/or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and show, by way of illustration, specific embodiments in accordance with the methods and structures of the present disclosure. Although these embodiments are described in sufficient detail to enable one skilled in the art to practice the described embodiments, it is understood that these examples are not limiting; other embodiments may be used, and changes may be made without departing from the spirit and scope of the described embodiments.

It will also be understood that, although the terms first, second, etc. may be used herein to describe various elements, these elements should not be limited by such terms. These terms are only used to distinguish one element from another. For example, a first step could be termed a second step, and, similarly, a second step could be termed a first step, without departing from the spirit and scope of the present disclosure.

The terminology used herein is for the purpose of describing particular embodiments only and is not intended to be limiting of the present disclosure. As used in the description of the invention and the appended claims, the singular forms "a", "an" and "the" are intended to include the plural forms as well, unless the context clearly indicates otherwise. By way of example only, while the singular form of numerous components and steps are described in various embodiments herein, it will be apparent that more than one of such components and/or steps can be used to accomplish the same. It will also be understood that the term "and/or" as used herein refers to and encompasses any and all possible combinations of one or more of the associated listed items. It will be further understood that the terms "comprises" and/or "comprising," when used in this specification, specify the presence of stated features, functions, integers, steps, operations, elements, and/or components, but do not preclude the presence and/or addition of one or more other features, integers, steps, operations, elements, components, and/or groups thereof. It will be similarly understood that the terms "including," "include," "includes", "such as" and the like, when used in this specification, are intended to be exemplary and should be construed as including, but not be limited to, all items recited thereafter. As used herein, the term "if" may be construed to mean "when" or "upon" or "in response to determining" or "in response to detecting," depending on the context.

As used herein, the term "planter" includes equipment, devices and other planter implement systems and/or technology used in planting operations. For example, the present disclosure contemplates that planters can include past planters, currently existing planters, future planters and other current and future equipment used in the planting process, including tractors, cabins, nurse tanks and bulk input devices. The various features of the disclosure are useful in connection with any device used in planting one or more seeds (e.g., broadcast planters, drill planters, air planters, bulk planters, individual row unit planters, clam-shell planters, cone planters, cyclone planters, pneumatic planters, finger planters, plate planters and the like), especially those devices that could be used to plant one or more combinations of seeds and seed-applied substances that are prescriptively selected for planting at one or more locations.

As used herein, the term "seed" includes seeds of any type of plants, including row crops, cereals, grains, oilseeds, fruits, vegetables, turf, forage, ornamental, nuts, tobacco, plantation crops and the like.

As used herein, the terms "substance" and/or "seed-applied substance" include any composition applied to seeds prior to the seeds being planted (e.g., when the seed comes in contact with the soil in a field). The seed-applied substance(s) can include active ingredients, other substances, combinations of more than one active ingredient and/or other substances, and/or mixtures having one or more active ingredients and/or one or more other substances. The active ingredients can include any type of substance that causes something to occur (for example the ingredient(s) in a pesticide that impact the pest, the ingredients in a fungicide that impact the disease and/or plant growth, health and/or vigor, the ingredients in a nematicide that impact the nematode, the ingredients in an inoculant and/or other plant growth and/or health substance that cause the plant to improve its growth, health and/or vigor). The active ingredients can include any past, present and/or future active ingredients and can be chemicals, biologicals, biostimulants, micronutrients and/or other compositions. Examples of some current potential active ingredients include clothianidin, ipconazole, trifloxystrobin, imidacloprid, metalaxyl, pyraclostrobin, *bradyrhizobium*, myclobutanil, thiamethoxam, abamectin, mefonoxam, fludioxonil, fipronil, azoxystrobin, cyantraniliprole, Rynaxypyr®, and the like. The other substances typically do not impact the target (for example pest, disease, nematode and/or plant growth, health and/or vigor), but can be helpful to include for a variety of reasons, including causing the active ingredients to be at the appropriate levels and/or concentrations to be efficacious but not harmful to the seed and/or plant, helping the active ingredient affix and/or stick to the seed, helping the treated seeds not stick to each other and/or other objects, improving the color of the treated seed (e.g., to indicate the seed is treated with a pesticide), increasing the number and/or amount of active ingredients a seed can absorb and/or otherwise carry and the like. Examples of some of these other substances include polymers, pigments, binders, surfactants, colorants, coatings, and other additives. The seed-applied substances can take any form, including wet and dry substances.

As used herein, the term "combination" includes one or more types and/or one or more amounts of seed-applied substances that are applied to a seed.

As used herein, the term "farmer" includes farmers, farm owners, farm managers, farm investors, farmer operators, seed companies, planter companies, chemical companies, biological companies, agricultural research companies and/or any other individual and/or entity that can engage in farm-related decisions and/or activities.

As used herein, the term "condition(s)" includes any circumstance that can impact what seed to be planted at a particular location and/or the type and/or amount of seed-applied substance(s) applied to such seed. In some embodiments, these conditions can include historical conditions, current conditions, future and/or predictive conditions and the like. By way of example, historical conditions can include past pests and/or diseases (e.g., corn rootworms, cutworms, aphids, nematodes, white mold, fungus), pest pressures, soil types, weather conditions, water levels, soil conditions (e.g., last-known nutrient, fertility, temperature and/or moisture levels of the soil), weeds, weed pressures, knowledge of the terrain of the field, and/or planting practices and/or associated yields. By way of further example, current conditions can include current pest type and/or levels, pest pressure, soil type, weather conditions, planting date, water levels, soil conditions, weed levels, weed type, weed pressure, field terrain of the field, global positioning system (GPS) coordinates, geographical location of the system, geographical location, other location-based conditions, seed availability, nearby pest pressures and/or trends, commodity pricing and/or other market conditions, planter gas level, planter engine and/or ground speed and/or other planting operational monitoring information. By way of still further example, future conditions can include weather forecasts and/or predictions, projected planting date, projected yield of seeds, and/or predicted commodity pricing and/or other market conditions. Additionally, the conditions can be based, at least in part, on historical measurements, real-time measurements, predicative measurements, analytics and/or the like.

Figure 1B:
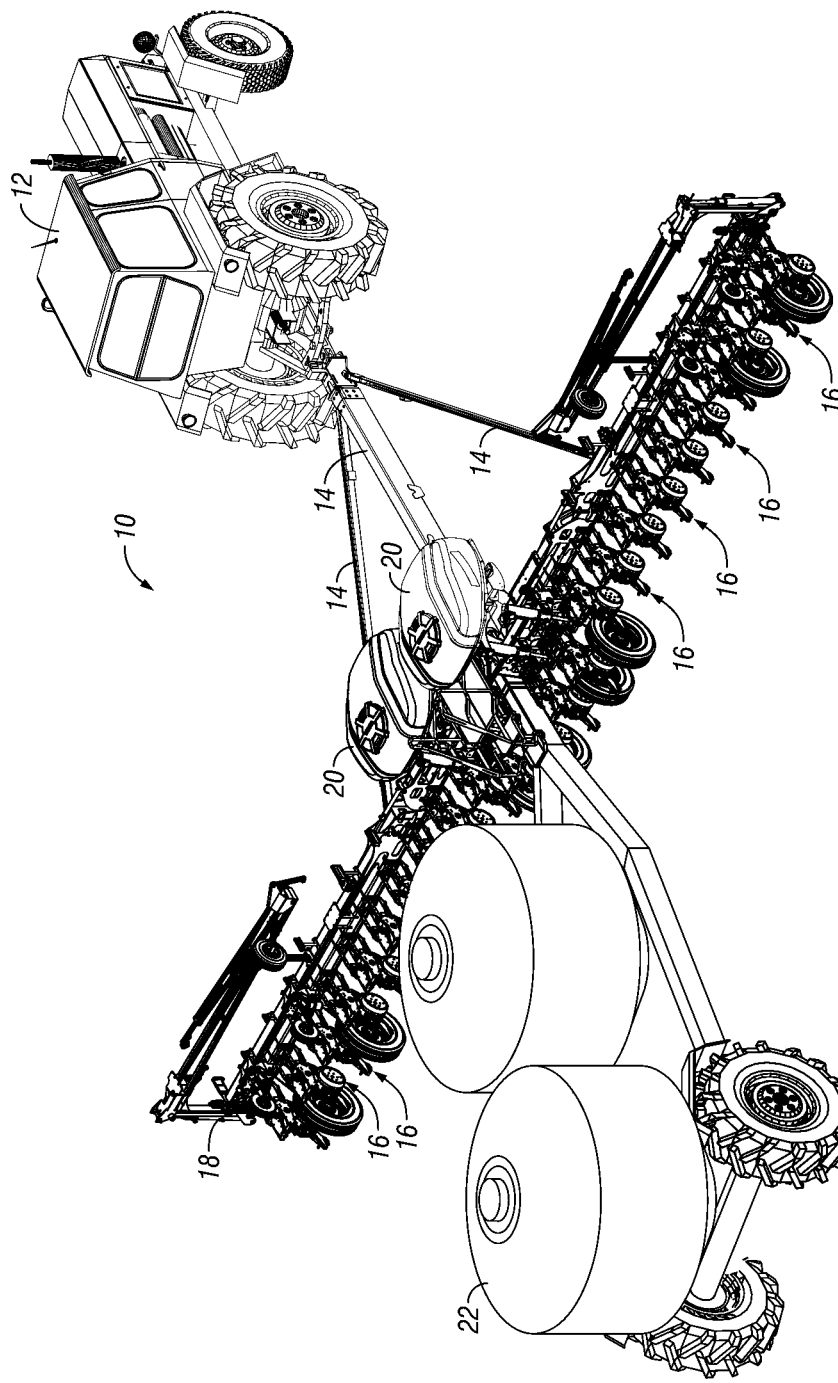
FIG. 1B is a front perspective view of a planter implement system in accordance with an illustrative embodiment.

FIGS. 1A and 1B illustrate exemplary agricultural equipment systems with which the objects of the present disclosure can be implemented. In a preferred embodiment, the agricultural equipment is comprised of a planter implement 10. The planter 10, as previously defined, can include a tractor 12 that can be operably connected to a draw bar 14 that can be operably connected to a framework 18, which can be comprised of any type, number and/or configuration of structural members to support the components of the planter 10, including one or more individual row units. FIG.

1A illustrates a planter 10 that can be configured with bins 20 associated with each row unit 16 along the length of the planter 10, commonly known as an individual row fill planter. FIG. 1B illustrates a planter 10 that can be configured with bins 20 centrally located along the framework 18, wherein the bins 20 can be operatively connected to each row unit 16 along the length of the planter 10, commonly known as a bulk fill planter.

In some embodiments, a bulk input device 22 can be operably connected to the individual row fill planter and/or the bulk fill planter. A bulk input device 22 can contain larger quantities of one or more agricultural inputs (e.g., seed, chemicals, fertilizer, etc.) for use in planting and/or related activities. In one exemplary embodiment, the bulk input device 22 can comprise a commodity cart containing bulk amounts of seed. The bulk input device 22 can be towably connected to the planter 10, as illustrated in FIGS. 1A and 1B, and/or otherwise connected to the planter 10 as commonly known in the art. As discussed in detail below, the bulk input device 22 can be operably connected to the bins 20 of each row unit 16 along the length of the individual row fill planter, and/or to the bins 20 of the bulk fill planter. In another exemplary embodiment, the bulk input device can comprise one or more bins 20. The bulk input device 22 typically minimizes the frequency with which a farmer reloads the planter 10. The bins 20 and/or the bulk input device 22 can store one or more types of seed. In some exemplary embodiments, the bins 20 can all store the same type of seed (e.g., varieties, blends of varieties, hybrids, blends of hybrids and/or the like). In other exemplary embodiments, each of the bins 20 can store a different type of seed (e.g., distinct varieties, blends of varieties, hybrid, hybrid blends, and/or the like). In still other exemplary embodiments, one or more bins 20 can store the same types of seed and one or more other bins 20 can store different types of seeds, such that while not all bins 20 store the same type of seed, some amount of overlap of seed type can occur across bins 20.

In some preferred embodiments, the bins 20 can be configured in a manner that each row unit 16 can get access to each type of seed that is to be planted by that particular row unit 16. This could be accomplished in many ways. For example, each row unit 16 could have its own dedicated set of bins 20 that contain enough of each type of seed that could be planted by such row unit 16 to be able to supply the proper amount of each of such type of seed to the row unit 16 during the planting operation. Typically in such embodiments, the number of bins 20 used and/or the overall amount of weight carried by the planter is likely relatively high because it may be preferable to include a buffer of each seed type at each bin 20 for each row unit 16 to increase the likelihood that enough of each type seed that could be planted by each row unit 16 is stored at the bins 20 for each row unit 16.

By way of further example, the bins 20 could be configured in a manner that each type of seed to be planted by the row units 16 has only one bin 20, and each of those bins can be operably connected to each row unit 16. In such embodiments, typically fewer, much larger bins 20 will be used. Also, the overall amount of seed and/or weight to be carried by the planter can be decreased at least in part because the buffer amount of each seed type that may be planted can be spread across all of the row units 16 and thus typically can be much smaller than what would be needed for embodiments having bins 20 dedicated to each row unit 16.

Many other embodiments other than these two examples could be employed, including configurations where more than one bin 20 containing one or more of the types of seed is located on the planter, but where one or more of those bins 20 can service more than one row unit 16.

Figure 2A:
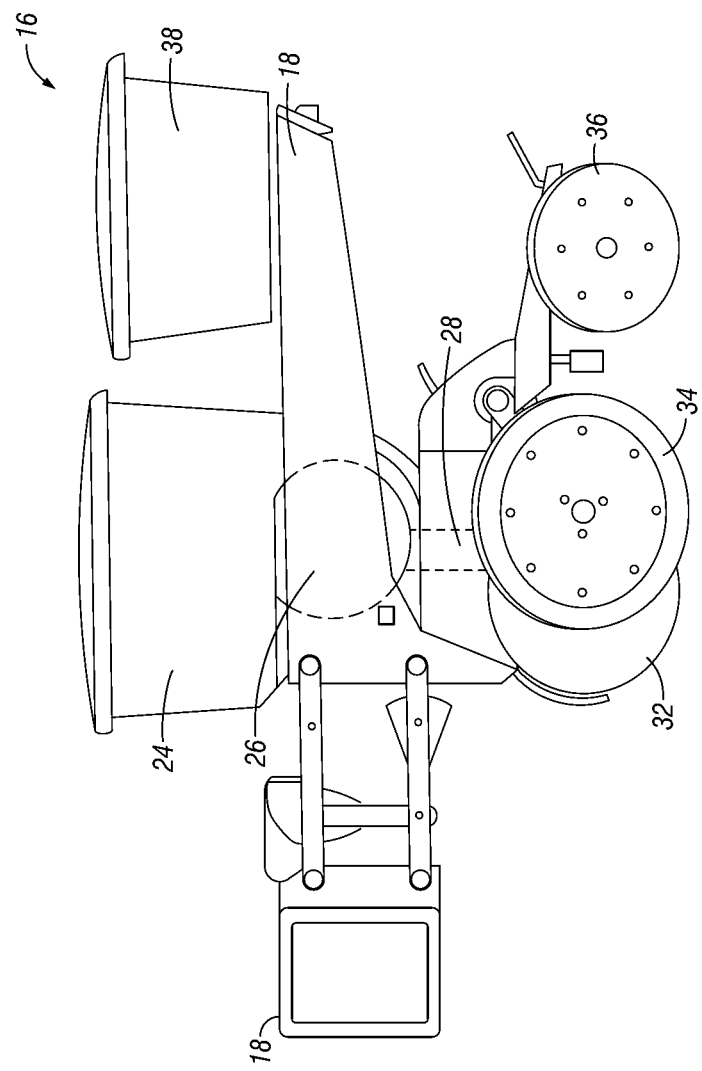
FIG. 2A is a side elevation view of a row unit in accordance with an illustrative embodiment.
Figure 2B:
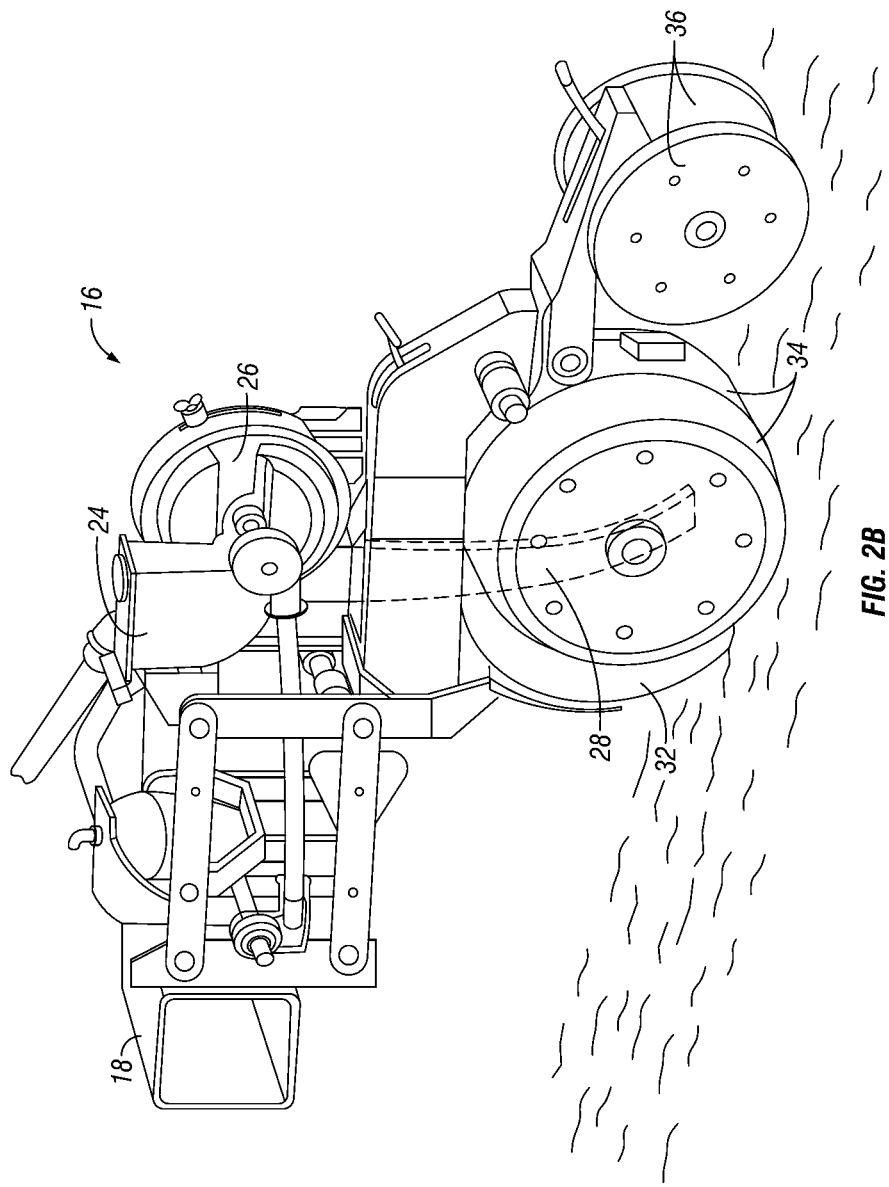
FIG. 2B is a front perspective view of a row unit in accordance with an illustrative embodiment.

Referring to FIGS. 2A and 2B, exemplary row units 16 of the planters 10 of FIGS. 1A and 1B, respectively, are illustrated. The row units 16 can be configured to meter a seed to a relative location on the field. In this particular embodiment, each of the row units 16 can comprise a seed hopper 24, a seed meter 26, a seed drop tube 28, an opening disc 32, seed firmer wheels 34, and closing wheels 36. A person having ordinary skill in the art is familiar with the operation of the above components comprising at least a portion of a seed flow path, which typically can extend from an origination point of the seed within the planter implement 10 (e.g., a bulk input device 22 and/or seed storage bin 20) to just before the seed hits the location where it is planted (e.g., a furrow and/or other location in a field). In short, the opening disc 32 can create a furrow within the field. A seed can be transferred from the seed hopper 24 to the seed meter 26, which typically can be configured to singularize the seeds in an effort to increase the likelihood that each specific location only receives one seed. The seed can pass through the seed drop tube 28 into the furrow, after which seed firmer wheels 34 can apply pressure to the seed in the furrow. The closing wheels 36 can close the furrow overtop the seed. Transferring seed through the seed flow path can be accomplished through a variety of means, including hydraulics, electric motors, vacuum pressure, positive air pressure, gravity, and the like. One or more of the components of the row unit 16 can comprise an insertion and/or dispersion device configured to insert the seed into the field and/or disperse the seed on top of the soil. The above process can occur at each and/or some row unit(s) 16 along the planter 10. A planter 10 can have one, two or any number of row units 16, but many modern commercial planters have as many as forty-eight row units with larger planters under development. The planters 10 illustrated in FIGS. 1A and 1B have sixteen and twenty-four row units 16 respectively.

A primary object of the present disclosure includes selecting a combination of seed and seed-applied substance to be planted at a location, including selecting seeds and one or more substances to apply to the seeds. In some embodiments, the seed-applied substances can be applied to the seeds prior to the seeds being loaded onto a planter implement 10. However, in other embodiments, one or more of the seed-applied substances may be applied to the seed during the planting operation. According to some of the latter embodiments, the one or more seed-applied substances that are applied to the seeds during the planting operation can be stored in one or more substance receptacles 38. In such embodiments, the one or more substance receptacles 38 can be located in many different locations on the planter implement 10. In some exemplary embodiments, a substance receptacle 38 can be associated with a particular row unit 16 of the planter 10, as shown illustratively in FIG. 2A. In other exemplary embodiments, each row unit 16 can have a plurality of substance receptacles 38 associated with it. In some exemplary embodiments, some row units 16 could have only one substance receptacle 38 associated with them while other row units 16 could have more than one substance receptacles 38 associated with them. In other exemplary embodiments, a single substance receptacle 38 could be associated with and/or used for all applicable row units 16.

Each substance receptacle 38 can contain one or more seed-applied substances. In embodiments with multiple substance receptacles 38, any particular substance receptacle 38 can contain any seed-applied substance regardless of what another substance receptacle 38 contains. For example, any two or more substance receptacles 38 could contain the exact same seed-applied substances, completely different seed-applied substances and/or have some of the same seed-applied substance and some different seed-applied substances. Furthermore, while the present disclosure contemplates that most combinations will have both a seed and at least one seed-applied substance, the present disclosure also contemplates that some seeds could be planted without any seed-applied substances without deviating from the spirit and scope of the present disclosure.

In some embodiments, one or more of the substance receptacles 38 can be partitioned into sub-receptacles. In some of those embodiments, the sub-receptacles could contain a plurality of seed-applied substances. In other embodiments, the sub-receptacles could each contain one or more of the same seed-applied substances, and typically would be transport those same seed-applied substances to different locations on the planter implement 10.

In another exemplary embodiment, at least a portion of the bulk input device 22 can comprise a substance receptacle 38. In some embodiments, the bulk input device 22 can be connected to one or more of the row units 16 and/or can supply the seed-applied substance to the same. In other of such embodiments, a bulk input device 22 could be connected to other locations on the planter implement 10 (e.g., seed delivery tubes 40) to supply the seed-applied substance to the same.

In still another exemplary embodiment, the substance receptacle 38 can comprise a partitioned receptacle 38. In some of those embodiments, the partitioned substance receptacle 38 could contain one or more seed-applied substances, as shown illustratively in FIG. 3, which will be discussed in detail below. In other embodiments, the partitioned substance receptacles 38 could each contain one or more of the same seed-applied substances, and typically could transport those same seed-applied substances to different locations on the planter implement 10.

Another primary object of the present disclosure—enabling a broader range of seed-applied substances for farmers—can be accomplished by, inter alia, applying the seed-applied substances during the planting operation. Certain embodiments of the present disclosure contemplate exposing seed-applied substances to air or other potentially harmful conditions just prior to planting the combination of seed and seed-applied substance(s). After the combination is planted, it is typically covered by soil, which allows some substances that otherwise would not be capable of being seed-applied substances to be used. In other words, the present disclosure can enable a much broader scope of seed-applied substances.

Similarly, at least in part because the present disclosure enables a broader range of biological seed-applied substances, it also can accomplish another of its primary objects—reducing the reliance on and/or amount used of chemical seed-applied substances. For example, some of the current and future biological products can essentially replace the use of similar chemical alternatives and thus in some embodiments biological seed-applied substances can be used instead of chemical alternatives.

Another primary object of the present disclosure is to make a prescriptive selection of which combination of seed and one or more seed-applied substances to plant based all and/or in part on one or more conditions.

Figure 3:
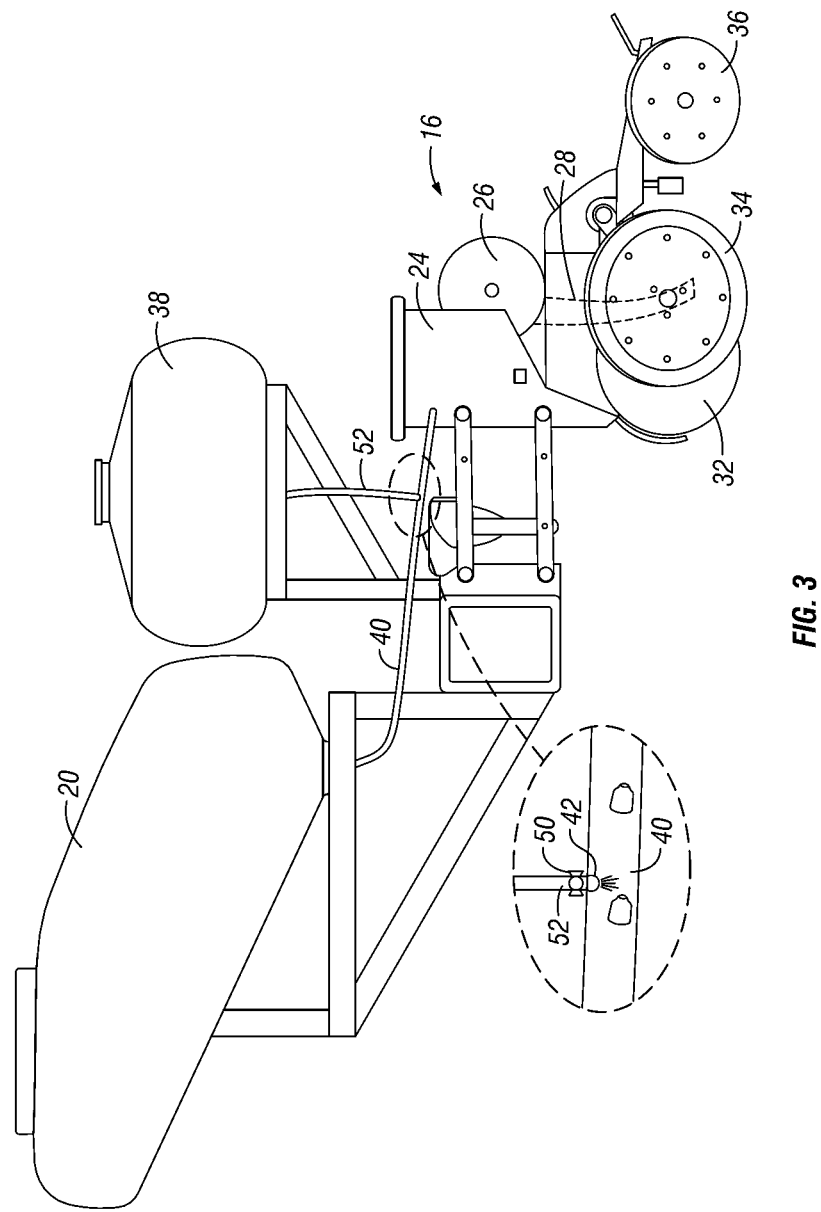
FIG. 3 is a side elevation view of a row unit in accordance with an illustrative embodiment.

An exemplary system for achieving one or more of the primary objects of the present disclosure is illustrated in FIG. 3. According to this exemplary embodiment, the system can comprise one or more seed flow paths and substance flow paths. A seed flow path can take many forms, but typically can comprise the initial storage area of the seeds on the planter implement and the path through which the seed passes prior to landing in the furrow and/or other location where the seed is planted. In some embodiments, the seed flow path can be comprised of one or more of the bins 20, one or more seed delivery tubes 40, one or more seed hoppers 24, one or more seed meters 26, and/or one or more seed drop tubes 28. The substance flow path can also take many forms, but typically can comprise the initial storage area of the seed-applied substances on the planter implement 10 (e.g., typically a substance receptacle 38 or compartment thereof) and the path through which the seed-applied substances pass prior to being applied to the seed. In some embodiments, the substance flow path can be comprised of one or more substance receptacles 38, one or more substance delivery tubes 52, and/or one or more substance applicators 42. In an exemplary operation, a seed can be dispensed from the bin 20, after which it can enter the seed delivery tube 40. The seed can be any seed type selected prior to and/or during the planting operation. The present disclosure contemplates that each iteration of a seed being dispensed from the bin 20 can be of the same or different seed type. According to one exemplary embodiment, one or more seed-applied substances can be dispensed from one or more of the substance receptacles 38 into one or more of the substance delivery tubes 52. One or more of the seed-applied substances can be applied to the seed by one or more substance applicators 42, which can be located in many locations including locations interior, exterior and/or proximate to the seed delivery tube 40. Indeed, in some exemplary embodiments, the seed-applied substance can be applied to the seed just prior to the seed entering, within, as the seed leaves and/or otherwise proximate to one or more seed delivery tubes 40. The seed-applied substance can be applied through many means, including means commonly known in the art. In an exemplary embodiment, one or more seed-applied substances can be applied by one or more substance applicators 42 operatively connected to the seed delivery tube 40, as shown illustratively in FIG. 3.

Exemplary substance applicators 42 for embodiments where one or more substance applicators 42 are located at and/or proximate to one or more seed delivery tubes 40 as well as at and/or proximate to other locations on the planter 10 can include many different types of spraying and/or applying technologies, including atomizers, jet nozzles, wheel nozzles, rotary spray heads, and the like. In some embodiments, an exemplary substance applicator 42 can include spray technology that allows seed-applied substance(s) to be mixed at the point of spray without altering the spray characteristics. As one example of how to do so, low-pressure air can be combined with low pressure seed-applied substance(s) in a cyclone chamber, producing shear between swirling air and the seed-applied substance(s) to produce the desired droplet size for spraying. Such an exemplary substance applicator 42 can provide control over chemical composition and enable more precise application. In some embodiments, it may be preferable to use one or more substance applicators 42 that can increase the accuracy of the application, minimize the amount of residue in the system and/or minimize the amount of potential dust off and/or other off target impacts from seed-applied substances.

In some embodiments, one or more metering mechanisms 50, including valves, gates, orifices and the like, can be operatively connected to the one or more substance applicators 42. One or more of these metering devices 50 can control the flow of one or more of the seed-applied substances and/or assist in synchronizing the flow of the seed-applied substances to one or more of the substance applicators 42 in time with the seed being in the right position at the right time so that the substance applicator 42 can apply the right type and/or amount of seed-applied substance to the seed.

In some embodiments, after the seed-applied substance is applied to the seed, the combination of seed and seed-applied substance can be delivered to an insertion and/or dispersion device. In embodiments where the application occurs prior to the seed entering the seed hopper, the combination can enter the seed hopper 24, be transferred to the seed meter 26, be discharged through the seed drop tube 28, and be planted into the field. As will be discussed in detail below, the system provides for numerous configurations whereby the combination of seed and type and/or amount of seed-applied substance can be prescriptively selected based, at least in part, on the field, region, batch, row, and/or seed position.

In lieu of or in addition to applying one or more of the seed-applied substances just prior to the seed entering, within, as the seed leaves, and/or otherwise proximate to one or more seed delivery tubes 40, the same can occur just prior to the seed entering, within, as the seed leaves, and/or otherwise proximate to any number of components within the seed flow path. For example, one or more of the seed-applied substance can be applied to the seed just prior to the seed entering, within, as the seed leaves and/or otherwise proximate to one or more seed hoppers 24, seed meters 26, and/or seed drop tubes 28. Some examples of such are shown illustratively in FIGS. 4 and 5.

By way of example, one or more seed-applied substances could be applied just prior to entering, within, as the seed leaves and/or otherwise proximate to one or more seed hoppers 24. Typically, seed hoppers 24 generally store lesser amounts of seeds than the bins 20. Thus, additional concerns could arise as a result of applying the seed-applied substance in the seed hopper. For example, these embodiments could increase the risk of agglomeration of seeds, cross-contamination of seeds with different seed-applied substances, and/or buildup of residue build up in the hopper itself. The buildup of residue can potentially increase defect rates in delivering seed to the seed meter 26). As a result, certain adjustments and/or additional functionalities may be appropriate in some seed hopper 24 application embodiments.

By way of example, to decrease the likelihood of seeds sticking together, many different options are available. For example, one or more of the seed-applied substances could be a substance that initiates quick drying and/or prevents and/or limits stickiness (e.g., sealants, coatings, talc's and the like) of the other seed-applied substances. Further, a rotating and/or other moving agitator could be added to a seed hopper 24 to cause the seeds therein to constantly be moving and thus decrease the likelihood of clumping of seeds.

By way of further example, to avoid seeds with different seed-applied substances rubbing off on each other, many options are available. One option could be to include multiple different compartments within a seed hopper 24 and have a lever and/or other segregating device that forces seeds of different types into the different compartments thereby segregating them. Further, some type of control mechanism could be employed and synchronized with the seed-applied substances and substance applicators 42 to actuate the lever and/or other segregating device to ensure the accuracy of the segregation.

By way of even further example, to avoid residue build up and/or to further decrease the likelihood of cross-contamination in a seed hopper 24, many options are available. By way of example, the substance applicator 42 could be housed and thus the application could occur in a self-contained compartment just prior to the seed entering, within, as the seed is within, as the seed is leaving, and/or the seed is otherwise proximate to one or more seed hoppers 24. Similarly, some type of flushing mechanism could be used when the seed hopper 24 and/or self-contained compartment is empty and/or idle and/or at regular intervals.

In some embodiments, one or more seed-applied substances can be applied to the seed just prior to the seed entering, as the seed is within, as the seed is leaving, and/or the seed is otherwise proximate to one or more seed meters 26. Some seed meters have holes that aid in singulating seeds just prior to dropping such seeds down the seed drop tube 28. In some embodiments, these same holes could be used to hold seeds in place while one or more substance applicators 42 apply one or more seed-applied substances. Further, in some of these embodiments, no agitation mechanism may be necessary as seeds typically would transfer into and through one or more seed drop tubes 28 and be planted without touching any other seed. However, given parts of seed meters 26 could be metal in certain embodiments, unless the one or more substance applicators 42 are very precise, waste and/or residue may build up on the metal and/or other parts, such that some flushing, cleaning, monitoring and/or replacement mechanism may be necessary. If the substance applicators are located at and/or near the exit point of the seed meter 26 (e.g., just after the seeds are transferred off the seed meter 26), the need for such mechanism could be reduced. For example, a self-contained substance applicator 42 could be employed at and/or near the exit point of the seed meter 26.

One of the preferred locations where seed-applied substances could be applied pursuant to the present disclosure is the seed drop tube 28. In some exemplary embodiments, one or more of the seed-applied substances can be applied to the seed just prior to the seed entering, as the seed is within, as the seed is leaving, and/or the seed is otherwise proximate to one or more seed drop tubes 40.

FIGS. 6A-6D, 7A-7C, and 8A-8D illustrate a few exemplary embodiments of seed drop tubes 28. Seed drop tubes 28 can take many forms but typically are designed to allow seed to move from a seed meter 26 (or another component of a planter implement 10) to a field. In some embodiments, seed drop tubes 28 can be an elongated structure disposed substantially vertically beneath one or more seed meters 26. A seed meter 26 often can eject a seed into a seed drop tube 28, which by air pressure, vacuum pressure, hydraulics, electric motors, force of gravity, belts, gears, and/or the like, travels through the seed drop tube 28 to the planting location. During its progression through the seed drop tube 28, the seed can receive a seed-applied substance from one or more substance applicators 42, which can be located in many different locations, but often would be part of and/or connected and/or otherwise affixed to the seed drop tube 28. Further, one or more metering mechanisms 50 can be operatively connected to one or more substance applicators 42. The application of one or more seed-applied substances in the seed drop tube 28 can provide for improved application of the seed-applied substance(s) than in-furrow applications of the same type of substances, of which only a small fraction, if any, comes in contact the seeds. Moreover, many in-furrow application substances cannot be and/or be combined with seed-applied substances because those substances actually can be harmful to seeds and/or the growth thereof. In fact, many in-furrow applications apply in-furrow substances away from the locations where the seed is to be planted to ensure the substances do not touch the seed when the seed is in the furrow.

Further, any excess seed-applied substance discharged by the substance applicators 42 can be collected and/or recycled, potentially saving a farmer significant expense. Still further, in embodiments where one or more of the seed-applied substances are applied within the seed drop tube 28, the configuration can advantageously minimize the buildup of residue from the seed-applied substances in the components of the seed flow path and/or other upstream system components.

Figure 4:
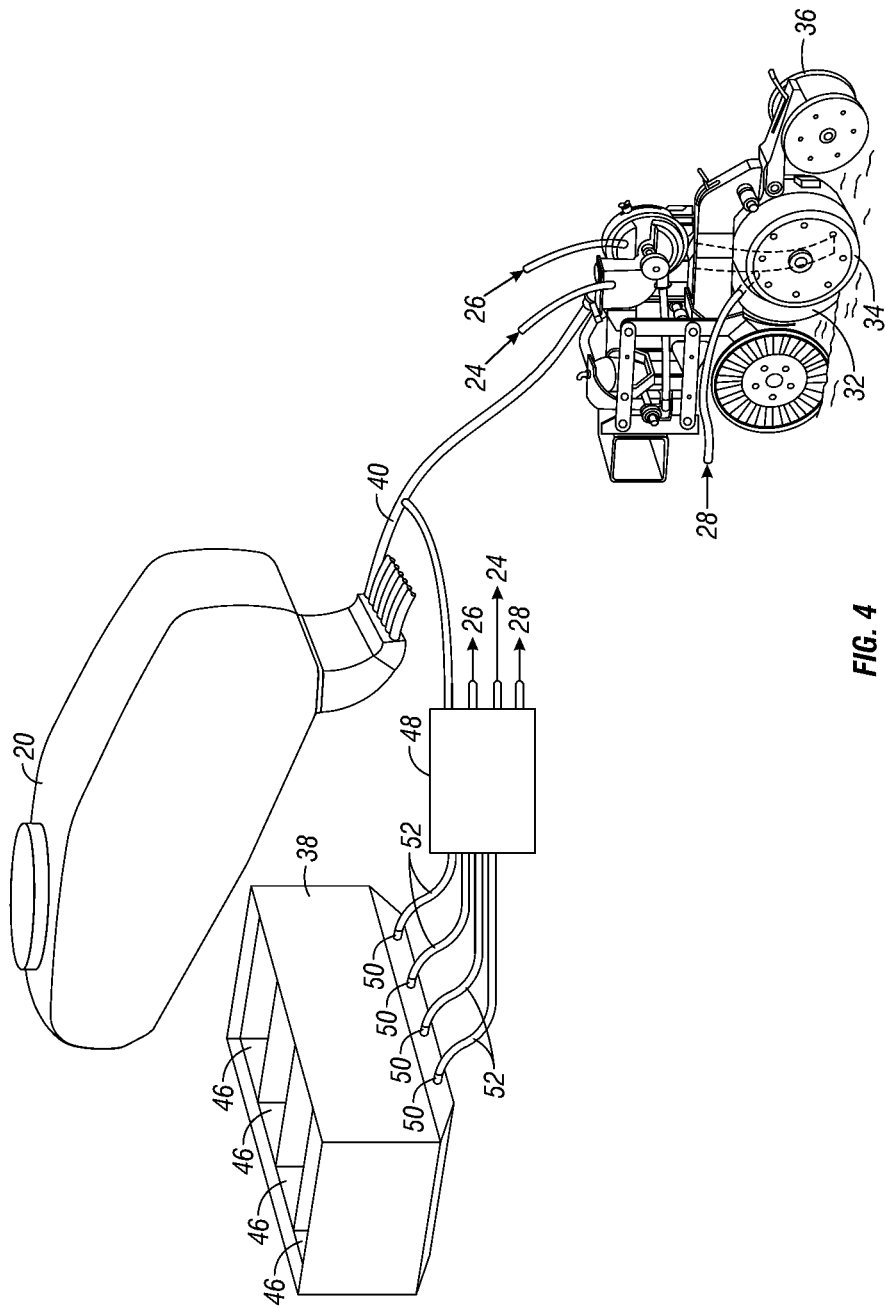
FIG. 4 is a partial schematic and partial perspective view of a planter implement system in accordance with an illustrative embodiment.
Figure 5:
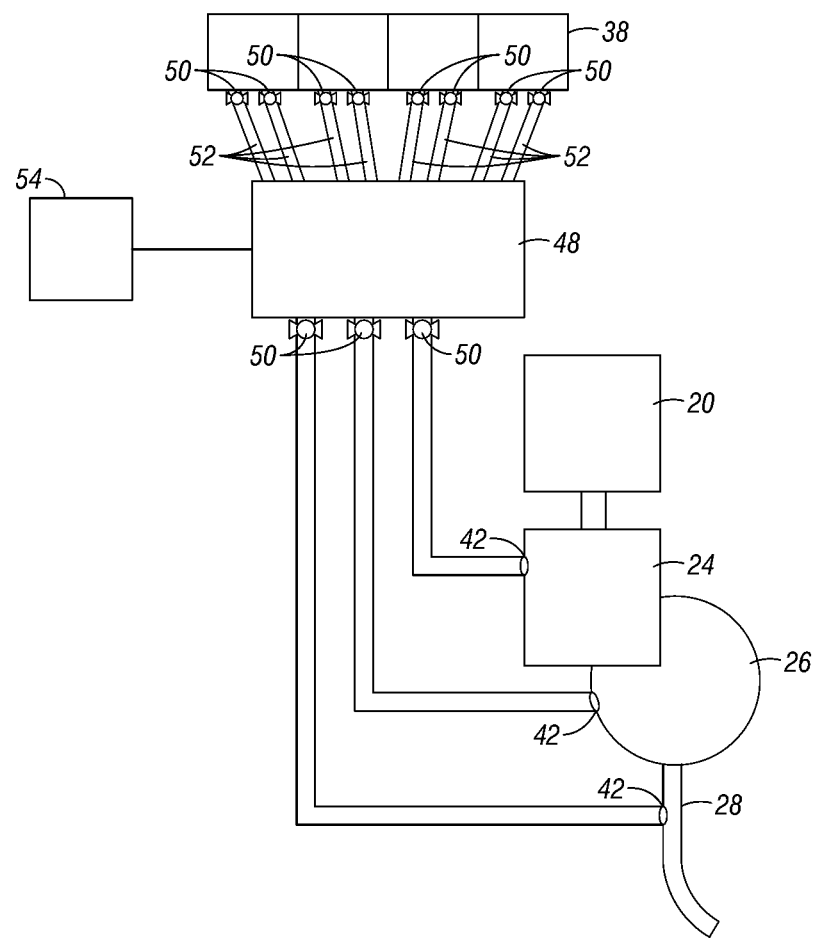
FIG. 5 is a schematic view of a planter implement system in accordance with an illustrative embodiment.

In some exemplary embodiments, including some of those illustrated in FIGS. 4 and 5, the substance receptacle 38 can be comprised of a plurality of compartments and/or sub-receptacles 46. Each of the plurality of compartments 46 can be adapted to receive any type of one or more seed-applied substances. For example, a plurality of compartments 46 can be adapted to receive a different type of seed-applied substance. Alternatively, two or more of the compartments 46 can receive the same type of seed-applied substance. Moreover, a compartment 46 could contain a plurality of seed-applied substances (e.g., mixtures). Additionally, a compartment 46 could contain one more of the same seed-applied substances as another compartment 46, and it could also contain one or more different seed-applied substances from that other compartment 46.

The compartments 46 can be filled with the seed-applied substance(s) prior to and/or during the planting operation in any way, including manually and/or automatically. In an exemplary embodiment, the substance receptacle 38, and more particularly the compartments 46, can be configured to hold uniformly sized containers having one or more of the seed-applied substance(s). In some embodiments, the containers can be installed, refilled, removed and/or replaced prior to and/or during the planting operation.

In some embodiments, the sub-receptacles could transport those same seed-applied substances to either different locations on the planter implement 10 or the same location (e.g., as a backup and/or alternative for a different sub-receptacle containing the same seed-applied substance).

In some embodiments, one or more of the compartments 46 can be in fluid connection with one or more mixing chambers 48 via one or more substance delivery tubes 52, and one or more mixing chambers 48 can receive a prescribed amount of one or more seed-applied substances from one or more of the compartments 46. Similarly, in some embodiments, one or more of the metering mechanisms 50 can control the flow of the seed-applied substances. In some embodiments, one or more metering mechanisms 50 can be operably connected to one or more of the compartments 46. One or more of the seed-applied substances can be transferred to components of the system through any means. For example, such transfer can be accomplished by means commonly known in the art, including, pneumatics (e.g., squeeze pump, and/or other positive and/or negative pressure mechanisms), hydraulics, chutes, channels, and/or mechanical conveyances (e.g., conveyor, belts, etc.).

In some embodiments, based, at least in part, on the needs of a specific seed location and/or other condition(s), a controller 54 can actuate one or more of the metering mechanisms 50 to release one or more seed-applied substances to one or more of the mixing chambers 48. In some embodiments, one or more of the seed-applied substance(s) can mix within and/or proximate to one or more of the mixing chambers 48, either through a natural confluence and/or through other means (e.g., mixer, agitator, etc.), after which the mixture can be transferred to one or more substance applicators 42, which can be in operable connection with one or more components of the seed flow path (e.g., seed delivery tubes 40, seed hoppers 24, seed meters 26, and/or seed drop tubes 28).

In some embodiments, mixing chambers may not be needed for many reasons. For example, if synchronized properly, the mere pressure of a pumping mechanism can cause multiple seed-applied substances to mix without the need of a separate mixing chamber 48. In some of such embodiments, more than one of the seed-applied substances could be transferred to one or more of the substance applicators 42 and be mixed in the substance flow path without using a mixing chamber, and the pumping mechanism could be set up to force the proper mixing of the seed-applied substances before one or more substance applicators 42 applies such mixed substance to the seed, as illustrated in FIG. 6D. In some embodiments, the compartments 46 could deliver their seed-applied substances to the same substance delivery tube 52 and the mixing could occur as those multiple seed-applied substances are transferred to one or more substance applicators 42. In some of such embodiments, one or more controllers 54 and/or other mechanisms could control the flow and/or timing of the delivery of the seed-applied substances to ensure the proper amount of each seed-applied substance to be applied to a particular seed is delivered to the substance flow path at the proper time to ensure such seed-applied substances are mixed and then applied by one or more substance applicators 42.

Figure 6A:
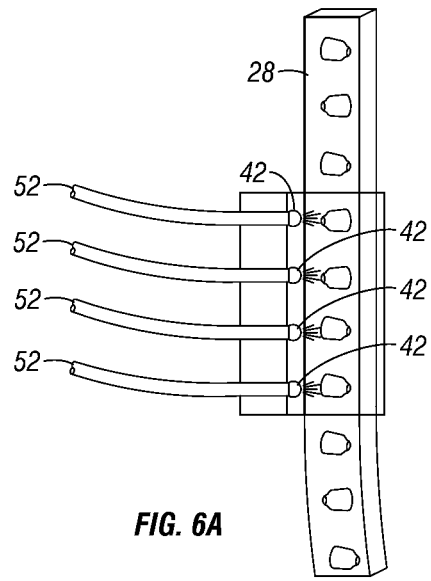
FIG. 6A is a schematic view of a seed drop tube and substance applicators in accordance with an illustrative embodiment.
Figure 6B:
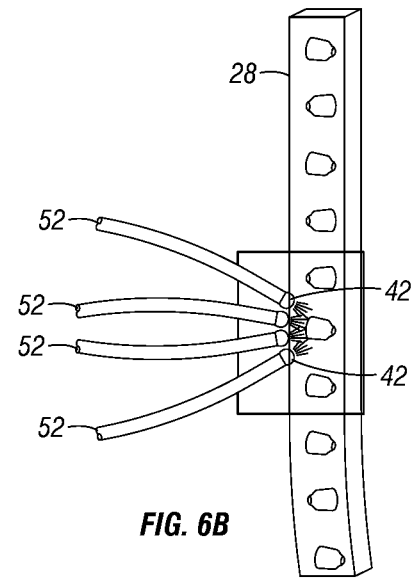
FIG. 6B is a schematic view of a seed drop tube and substance applicators in accordance with an illustrative embodiment.
Figure 6C:
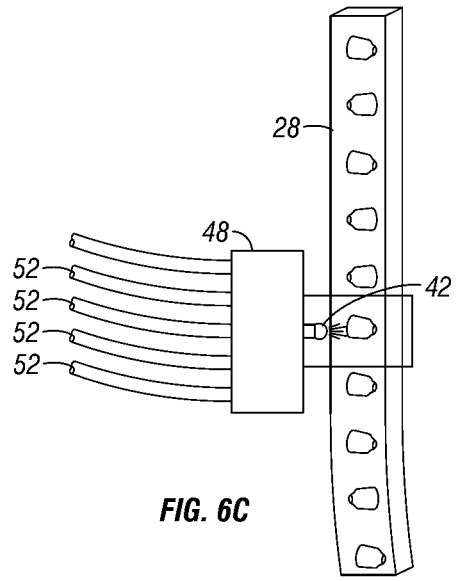
FIG. 6C is a schematic view of a seed drop tube and a substance applicator in accordance with an illustrative embodiment.
Figure 6D:
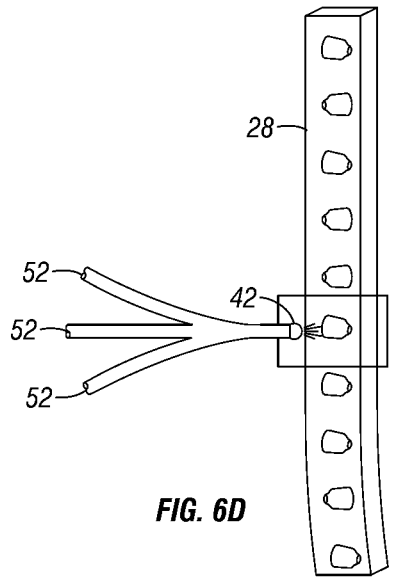
FIG. 6D is a schematic view of a seed drop tube and a substance applicator in accordance with an illustrative embodiment.

Additionally, as set forth in exemplary embodiments illustrated in FIGS. 6A, 6B and 6D, the substance flow path can be constructed in a manner where the seed-applied substances do not mix in a mixing chamber and/or a substance delivery tube 52 prior to application by one or more substance applicators 42. For example, one or more of the substance delivery tubes 52 of one or more compartments 46 could connect to one or more substance applicators 42 only connected to one substance delivery tube 52 and/or compartment 46. In one such construction, each compartment 46 could have one substance delivery tube 52 that connects to one substance dispensing mechanism in a one-to-one fashion. In some configurations, the multiple substance dispensing mechanisms can be arranged along one or more components of the planter implement 10. In one such example, the multiple substance dispensing mechanisms can be arranged along the length seed drop tube 28. In another example, seed-applied substances can be successively applied from any number of substance dispensing mechanisms as the seed is traversing through the seed drop tube 28, and one or more controllers 54 and/or other mechanisms can be employed to control whether the seed, based, at least in part, on one or more planting conditions, needs the seed-applied substances that correlated with the series of substance dispensing mechanisms and could cause only those substance dispensing mechanisms that correlate with the seed-applied substances needed for such seed to trigger and/or apply the relevant seed-applied substances to the seed. The seed-applied substances correlated with the substance dispensing mechanisms can be of any type, including multiple different types of a particular class of seed-applied substance. For example, a first substance dispensing mechanism can be associated with insecticide seed-applied substance, a second substance dispensing mechanism with a fungicide seed-applied substance, and a third substance dispensing mechanism with a nematicide seed-applied substance, and based, at least in part, on one or more conditions, one or more controllers 54 and/or other mechanisms can determine whether the seed being planted at a particular field location requires such insecticide, fungicide and/or a nematicide. If, for example, one or more controllers 54 and/or other mechanisms determine only the insecticide and nematicide are needed for a particular seed, as the seed transfers through the appropriate portion of the seed drop tube 28, the first substance dispensing mechanism and the third substance dispensing mechanism can be activated to apply the associated substances to the seed. In this particular example, the seed can receive successive applications, layers and/or coatings of seed-applied substances. One or more substance applicators 42 can be closely grouped, as illustrated in FIGS. 6A and 6B, and/or spaced at any distance so as to apply the seed-applied substance to the seed.

Figure 7A:
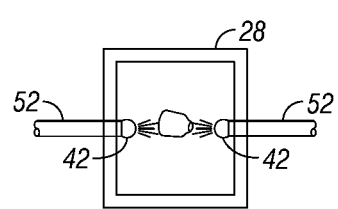
FIG. 7A is a top plan view of a seed drop tube and substance applicators in accordance with an illustrative embodiment.
Figure 7B:
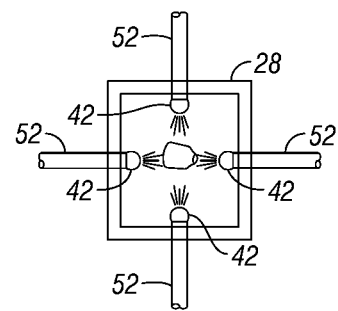
FIG. 7B is a top plan view of a seed drop tube and substance applicators in accordance with an illustrative embodiment.
Figure 7C:
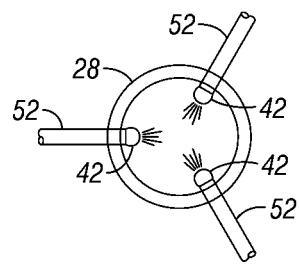
FIG. 7C is a top plan view of a seed drop tube and substance applicators in accordance with an illustrative embodiment.

The present disclosure contemplates the seed-applied substance can be applied in any fashion, including in serial, in parallel, and/or any combination of the two, and/or one or more substance applicators 42 can apply seed-applied substances to the seed at any location, including just prior to the seed entering, within as the seed leaves and/or otherwise proximate to a particular component. For example, one or more substance applicators 42 within a seed drop tube 28 could apply one or more seed-applied substances at the same location (FIG. 6B) and/or in multiple locations (FIG. 6A). In some embodiments, one or more substance applicators can be situated such that for a particular seed they all trigger simultaneously and/or nearly so and/or create a mist that is applied to such seed essentially at the same time. Additionally, in some embodiments, the substance dispensers can all face the same direction, as illustrated in FIGS. 6A-6D), and/or face multiple directions (e.g., multiple sides of the seed drop tube 28), as illustrated in FIGS. 7A-7C.

In still another exemplary embodiment illustrated in FIG. 6C, the substance delivery tubes 52 can be configured to mix within and/or proximate to a mixing chamber, and can be further configured to be a single substance applicator 42. In yet another exemplary embodiment, the substance delivery tubes 52 can be connected or otherwise joined into a singular substance delivery upstream of the substance applicator 42, as shown illustratively in FIG. 6D. Further, in some embodiments, the substance delivery tubes 52 can be combined prior to or at the substance applicator 42. In some embodiments, the substance applicator 42 could simultaneously apply the seed-applied substances to the seed and/or could quickly individually apply each of the relevant seed-applied substances from each of the relevant substance delivery tubes 52 as the seed traverses past the substance applicator 42. Similar to the serial application configuration previously expressed herein, one or more controllers 54 and/or other mechanisms can actuate the metering mechanisms 50 associated only with the substances to be dispensed to a particular seed at a particular seed location in particular embodiments.

Due to some of its advantages, the present disclosure contemplates additional exemplary configurations of when the seed-applied substance is applied just prior to the seed entering, within, as the seed leaves, and/or otherwise proximate to the seed drop tube 28. Notably, any type of seed drop tube 28 (including multiple different types of seed drop tubes 28) can be used pursuant to present disclosure, including air tubes, brush tubes, seed accelerators and the like. Further, though seed drop tubes 28 are often oriented so the seed can travel down with the flow of gravity, any orientation of the seed drop tubes 28 can be used without deviating from the objects of the present disclosure. Embodiments with air tubes are relatively simple. For example, air tubes typically comprise just a simple tube without many, if any, additional parts, and the simple tubes often can be made of simple materials including rubber, plastic, non-corrosive metals and the like. In some air tube embodiments, one or more substance applicators 42 can be located just about anywhere along the seed drop tube 28. For example, one or more substance applicators could be affixed to the middle portion of the air tube and apply the seed-applied substances to the seed as it traverses past one or more of the substance applicators 42. For further example, one or more substance applicators 42 could be located at and/or proximate to the bottom of the seed drop tube 28.

Embodiments with a brush tube and/or a seed accelerator can be somewhat more complicated. For example, some brush tubes comprise one or more brushes that are designed to attempt to singulate seeds typically after they leave one or more seed meters, and such brushes attempt to push a single seed down the brush tube (typically having the capability of doing so at a rate faster than gravity). Because the brushes would typically be made of materials that could absorb and/or collect seed-applied substances and thus potentially become less effective with residue build up and/or be difficult to clean, substance applicators preferably would be situated such that the seed-applied substances they dispense come in minimal, if any, contact with the brushes. For example, one or more substance applicators 42 could be located at the bottom of the brush tube and/or in a separate application chamber.

According to some embodiments, including some of those illustrated in FIGS. 8A-8D, the seed drop tube 28 can be comprised of one or more seed accelerators comprising one or more accelerator belts 56 typically having a plurality of sections 58 that can be separated by a plurality of ridges 62, each of the sections 58 can be configured to preferably transport one seed. In some embodiments, the accelerator belt 56 can be articulated and extend between two or more gears 60, at least one of which can be driven by a motor (not shown) and/or any other means commonly known in the art. In operation, one of the sections 58 of the accelerator belt 56 typically can receive a seed dispensed from one or more seed meters 26, and the accelerator belt 56 typically can accelerate (e.g., at a speed greater than the seed would fall due to the force of gravity) the seed through the seed drop tube 28, during which the seed typically remains within the section 58 due at least in part to the adjacent ridges 62 and/or the closely conforming housing of the seed drop tube 28. At the base of the seed drop tube 28, the accelerator belt 56 can be inverted and the seed can disengage from the seed accelerator belt 56 by various means, including, in this particular example, the force of gravity, after which the seed can traverse towards the furrow. In some embodiments, prior to, while and/or just after leaving the seed drop tube 28, one or more substance applicators 42 can apply one or more seed-applied substances to the seed, as shown illustratively in FIGS. 8A and 8D.

Figure 8A:
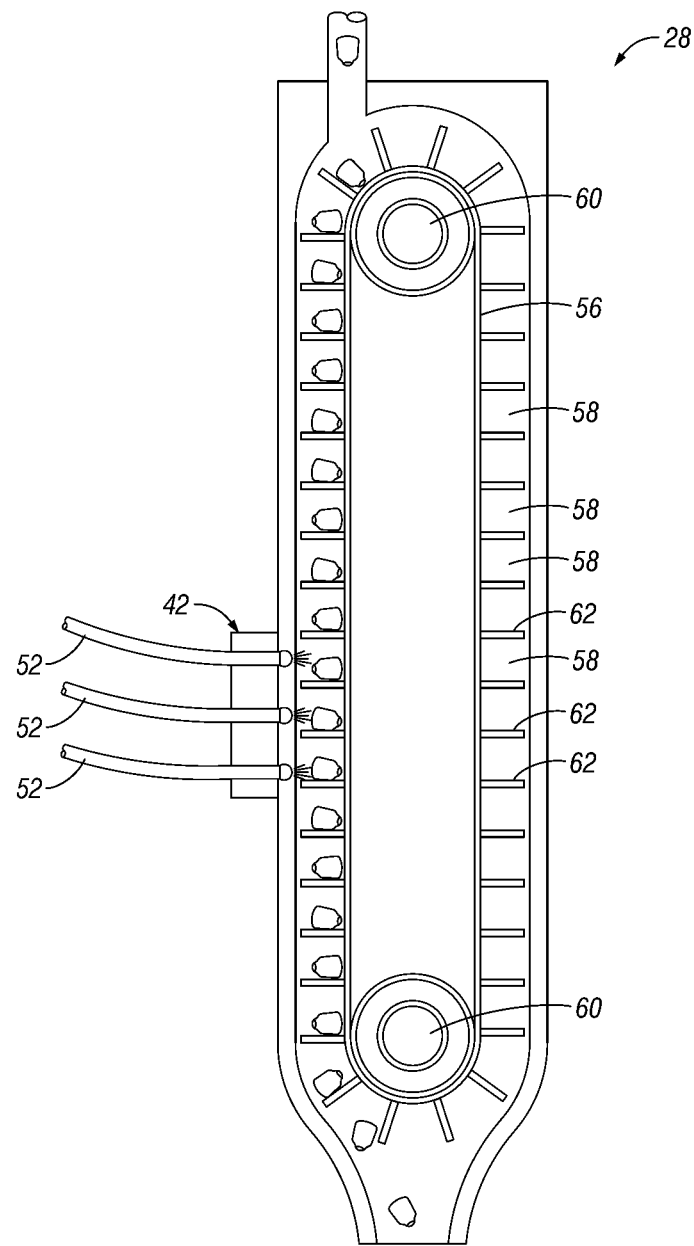
FIG. 8A is a schematic view of a seed drop tube configuration and substance applicators in accordance with an illustrative embodiment.
Figure 8B:
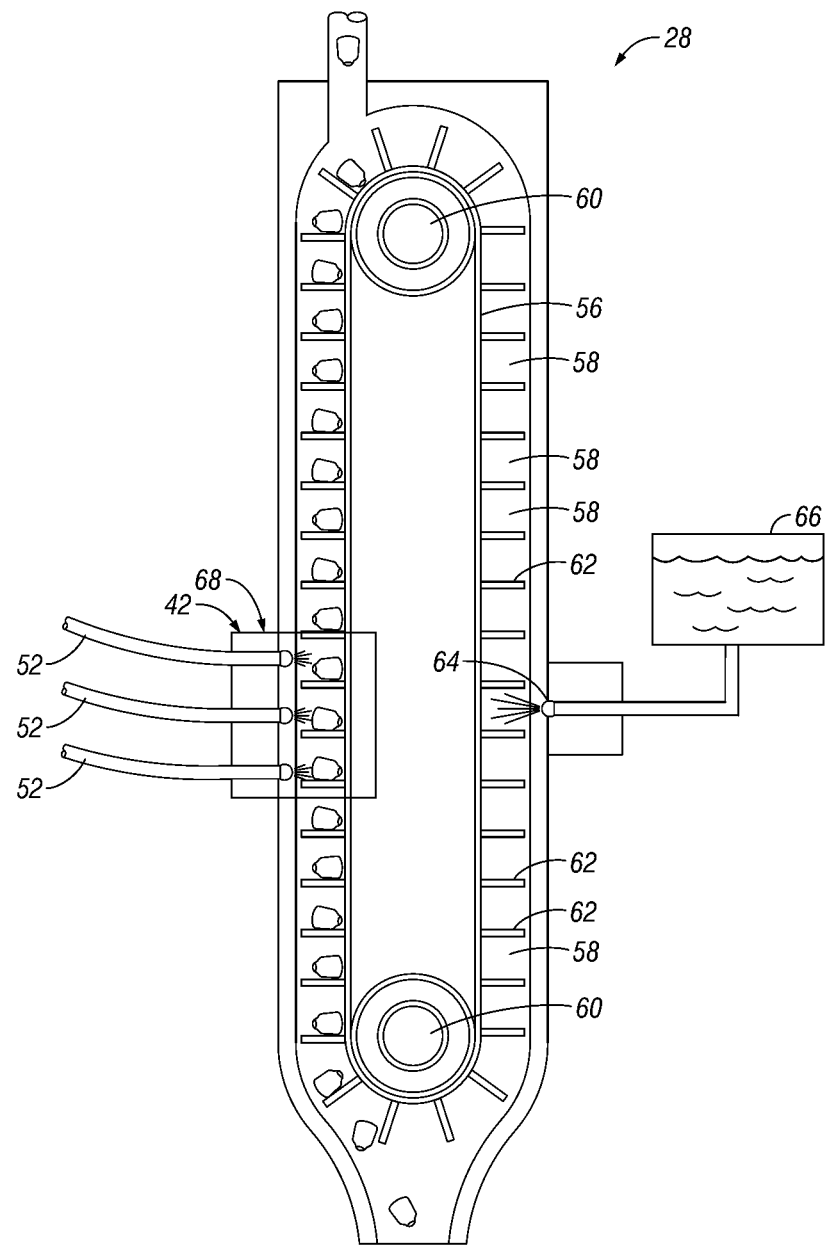
FIG. 8B is a schematic view of a seed drop tube configuration and substance applicators in accordance with an illustrative embodiment.

In the exemplary embodiment of FIG. 8B, one or more substance applicators 42 can apply one or more seed-applied substances to the seed prior to disengagement of the seed from one or more accelerator belts 56. FIG. 8B illustrates that one or more substance applicators 42 can be located in a middle portion of one or more seed drop tubes 28; however, the present disclosure contemplates that one or more substance applicators 42 can be located at any point along the seed flow path (e.g., along one or more seed drop tubes 28) without deviating from the objects of the present disclosure. For example, just as with air tubes and brush tubes, in some seed accelerator embodiments including the one illustrated in FIG. 8D, one or more substance applicators 42 can be located at, below, and/or proximate to the bottom of one or more seed accelerators and/or other seed drop tubes 28.

Regardless of the type of seed drop tube 28, in some embodiments, one or more of the substance applicators 42 could be positioned at and/or proximate to the bottom of one or more seed drop tubes 28 to apply one or more seed-applied substances to seed in many different ways. As previously expressed herein, the seed-applied substances can be applied just prior to the seed entering, within, as the seed leaves, and/or otherwise proximate to one or more seed drop tubes 28, as the seed is leaving the one or more drop tubes 28, and/or even after the seed has left one or more seed drop tubes 28. Notably, the present disclosure avoids applying the seed-applied substances to the furrow itself for a variety of reasons. For example, in-furrow applications of seed-applied substances can decrease the effectiveness of seed-applied substances, as the seed typically does not reap as much of the benefit of seed-applied substances when applied in the furrow and typically in-furrow applications do not cover and/or otherwise touch as much of the surface of the seed. Further, in-furrow applications could increase the likelihood that the seed-applied substances could be mixed with other in-furrow applications, many of which are potentially harmful to the seed and/or its health, emergence, growth and/or vigor.

Furthermore, any configuration of one or more substance applicators 42 discussed above (including those illustrated in FIGS. 6A-6D), can be incorporated into one or more seed drop tubes 28 having one or more accelerator belts 56. Regardless of what type of seed drop tube(s) 28 are being used, due to the location of one or more substance applicators 42, it is possible that a portion of one or more seed-applied substance(s) being applied to one or more seeds can contact components of one or more seed drop tubes 28, including one or more accelerator belts 56, resulting in accumulation of residue. Further, as the prescriptive nature of the present disclosure can in some embodiments benefit from certain seed locations receiving different substances and/or mixture of substances, one or more flushing mechanisms 64 can be associated with the seed drop tube 28. In some embodiments, including the one illustrated in FIG. 8B, one or more flushing mechanisms 64 may be located on a side opposite one or more substance applicators 42. One or more flushing mechanisms 64 can be in fluid connection with one or more flushing reservoirs 66 that can contain one or more substances configured to reduce and/or remove any residue from the relevant component (e.g., the accelerator belt 56).

In some embodiments, one or more containment chambers 68 can be associated with one or more seed drop tubes 28 and enclose a portion of the relevant component (e.g., the accelerator belt 56 in this example) proximate to one or more substance applicators 42. In some embodiments, one or more accelerator belts 56 can enter and/or exit one or more containment chambers 68 through openings, which in this example are located in the upper and lower portions of the same, respectively. One or more containment chambers 68 can be configured to minimize the exposure of the components within and/or proximate to one or more seed drop tubes 28 to the seed-applied substance(s). While in this particular example the containment chambers 68 were used in connection with seed drop tubes 28, one would understand that similar concepts could be adapted and/or applied to embodiments where one or more substance applicators 42 are located at and/or proximate to other components of a planter implement 10, including seed delivery tubes 40, seed hoppers 24 and seed meters 26. The present disclosure contemplates that the containment chambers 68 can comprise a portion of the seed flow path and/or the substance flow path regardless of whether they are part of or proximate to any other components of the seed flow path (e.g., seed delivery tubes 40, seed hoppers 24, seed meters 26 and/or seed drop tubes 28) and/or substance flow path.

Figure 8C:
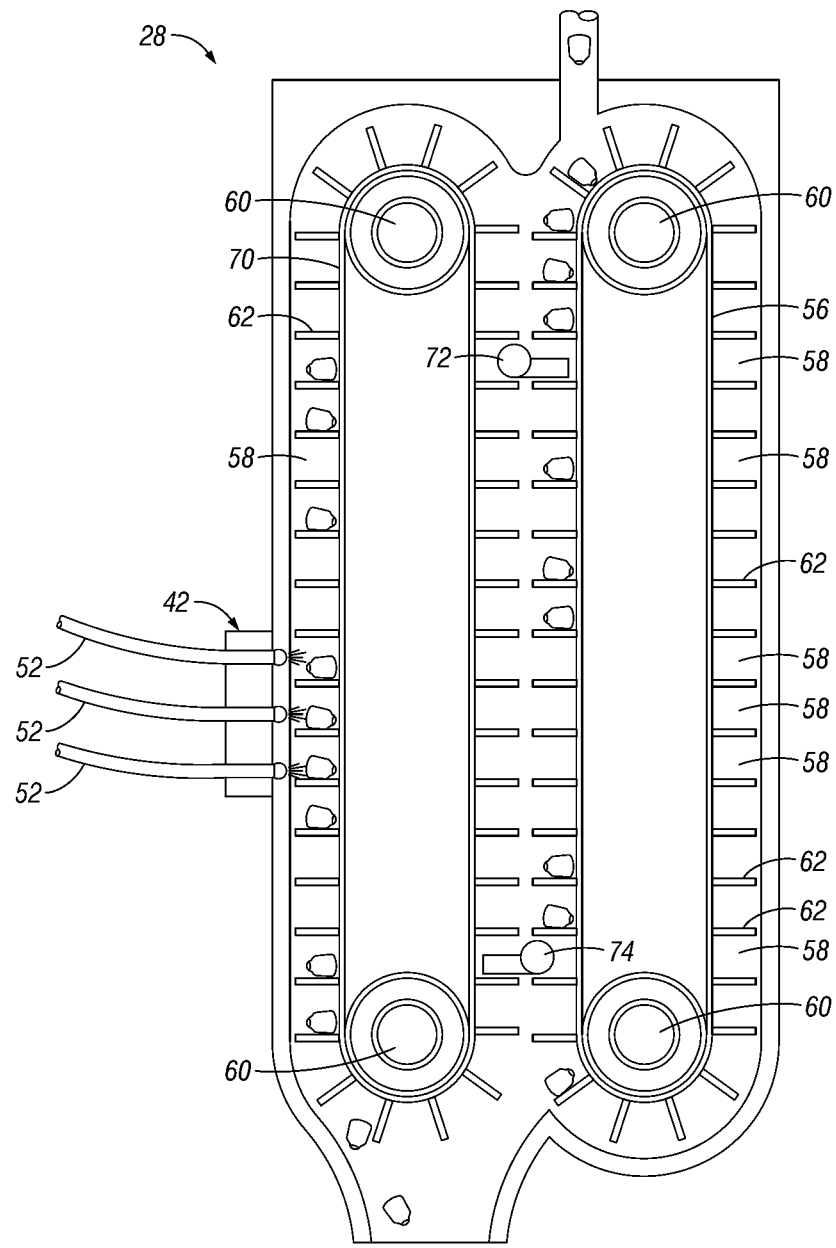
FIG. 8C is a schematic view of a seed drop tube configuration and substance applicators in accordance with an illustrative embodiment.
Figure 8D:
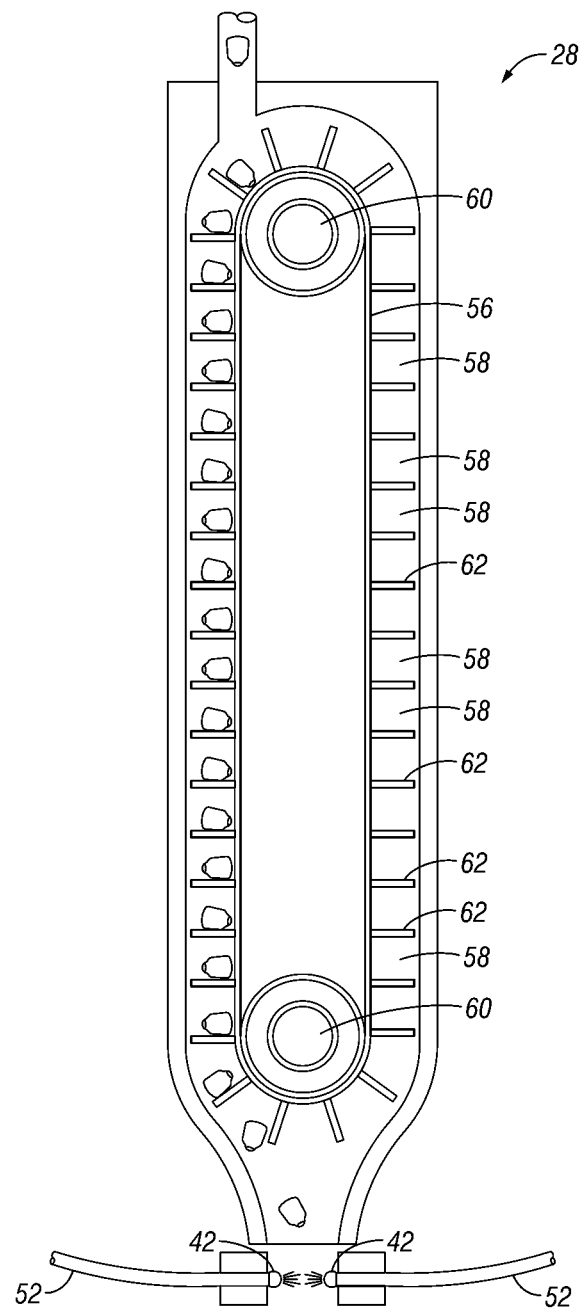
FIG. 8D is a schematic view of a seed drop tube configuration and substance applicators in accordance with an illustrative embodiment.

Referring to FIG. 8C, still another exemplary embodiment of a seed drop tube 28 is illustrated. In this illustrative embodiment, the seed drop tube 28 comprises an accelerator belt 56, a substance application belt 70 and one or more deflectors 72, and the accelerator belt 56 is configured to receive a seed of a particular seed type from one or more seed meters 26 as previously discussed herein. In the illustrated embodiment of FIG. 8C, the accelerator belt 56 rotates in a clockwise direction, but the present disclosure contemplates that the accelerator belt 56 could rotate in any direction. In this particular embodiment, upon the detection and/or presence of a condition triggering a seed to receive one or more seed-applied substances, one or more deflectors 72 can be actuated by one or more controllers 54 and/or other mechanisms to transfer the seed from the accelerator belt 56 to the substance application belt 70. The ridges 62 of the accelerator belt 56 can be comprised of any material, but rubber or similarly elastic material may be used such that the deflector effectively captures the seed couched in the section 58 of the accelerator belt 56. In the illustrated embodiment of FIG. 8C, the substance application belt 70 rotates in a counterclockwise direction, but the present disclosure contemplates that the substance application belt 70 can rotate in any direction so long that it can function smoothly with the accelerator belt 56. As a result, the seed in this example that is transferred from the accelerator belt 56 to the substance application belt 70 travels past the substance applicator 42, during which one or more seed-applied substances are applied to at least a portion of the seed. The combination of a seed and seed-applied substance can be dispensed from the seed drop tube 28 and/or transferred to the accelerator belt 56 via a second deflector 74. Similar to the operation of the deflector 72, one or more controllers 54 and/or other mechanisms can actuate the second deflector 74 to capture the seed from the substance application belt 70. In instances where the combination of seed and seed-applied substance is returned to the accelerator belt 56 pursuant this example, the combination can be dispensed from the accelerator belt 56 and the seed drop tube 28. The present disclosure contemplates that the flushing reservoir 66 and mechanism 64 of FIG. 7B can be implemented into many different embodiments of the present disclosure, including the embodiment of FIG. 7D. Furthermore, any configuration of the substance application 42 discussed above (for example those illustrated in FIGS. 6A-6C), can be incorporated into the seed drop tube 28 having an accelerator belt 56 and substance application belt 70.

The present disclosure contemplates that the seed-applied substances could be applied all at the same component of the planter implement (e.g., all at the seed drop tubes 28, all at the seed meters 26, all at the seed hoppers 24, all at the seed delivery tubes 40 and the like), but the present disclosure also contemplates other embodiments. For example, the seed-applied substances could be applied at more than one component of the planter implement 10. FIG. 5 illustrates an exemplary embodiment where one or more seed-applied substances can be applied just prior to the seed entering, within, as the seed leaves, and/or otherwise proximate to one or more seed hoppers 24, seed meters 26, and/or seed drop tubes 28. In some of such configurations, different seed-applied substances could be applied at different components for a variety of reasons including because of the needs of the application. For example, based, at least in part, on one or more conditions discussed below, an insecticide could be applied just prior to the seed entering, within, as the seed leaves, and/or otherwise proximate to the seed hopper 24, a fungicide can be applied just prior to the seed entering, within, as the seed leaves, and/or otherwise proximate to the seed meter 26, and an inoculant can be applied just prior to the seed entering, within, as the seed leaves, and/or otherwise proximate to the seed drop tube 28. Similarly by way of illustration, a base fungicide could be applied to all seeds just prior to the seed entering, within, as the seed leaves, and/or otherwise proximate to the seed delivery tubes 40 and/or seed hopper 24, but unique combinations of other seed-applied substances could prescriptively be applied just prior to the seed entering, within, as the seed leaves, and/or otherwise proximate to other locations (e.g., at one or more seed meters and/or seed drop tubes 28) based, at least in part, on one or more conditions. This could decrease the need to address cross-contamination concerns in the seed hoppers 24 (e.g., seed hoppers 24 would only be exposed to one type of seed-applied substance) while still allowing for prescriptive treatments of seed. Some of these embodiments may be helpful in embodiments where certain seed-applied substances may not mix well together, but can be applied serially.

While many of the embodiments of the present disclosure contemplate planter implements 10 with multiple individual row units 16 typically including seed hoppers 24, seed meters 26 and/or seed drop tubes 28, the present disclosure also contemplates planter implements 10 with only one row unit 16, with row units 16 not including all of such components and even without row units. For example, in some embodiments, the planter 10 can be a drill planter. In some drill planter embodiments, one or more seeds can be stored in one or more bins (typically a single large bin that can extend across the width of the back of the planter) that typically transfer one or more seeds to one or more insertion and/or dispersion devices (typically a series of seed drop tubes) that plant one or more seeds (typically in rows) in a manner similar to that described above, but such embodiments typically do not have seed hoppers and sometimes do not have seed meters. In some drill planter embodiments, while one or more substance applicators could still be located anywhere along the seed flow path, they preferably would be located at and/or proximate to the seed drop tubes.

Further, in some embodiments, the planter 10 can be a broadcast planter, which may not have any row units. In some broadcast embodiments, seeds will be stored in a bin and be transferred to one or more metering wheels and/or other insertion and/or dispersion devices typically via one or more slide gates. Further, in some broadcast embodiments, the applicable metering wheel(s) and/or other seed insertion and/or dispersion device(s) plant the seed by spraying and/or otherwise inserting and/or dispersing the seeds (typically a group of seeds at the same time). In some broadcast embodiments, while the substance applicators could still be located anywhere along the seed flow path, they preferably would be located at and/or proximate to one or more slide gates and/or metering wheels. For example, one or more substance applicators could be situated to apply the seed-applied substances to one or more seeds as they leave one or more slide gates and/or as they leave one or more metering wheels. Moreover, in some embodiments, the planting location of the seed could be the range of the broadcasting of the seed (e.g., broadcast radius) via the applicable metering wheel (and/or other insertion and/or dispersion device) rather than a single specific seed location or could use algorithms to calculate where each seed will land and use such as the planting location on a seed-by-seed basis.

Moreover, the present disclosure contemplates the seeds to which seed-applied substances are applied can be already treated with one or more seed-applied substances (e.g., be pre-treated), have been treated with no prior seed-applied substance and/or combinations of the same. In some of the former embodiments, for example, some seed-applied substances may not be sufficiently durable to apply prior to planting, but provide significant value to a farmer. However, some seed companies, distributors and/or retailers may choose to sell only seed that is pre-treated with at least a base package of seed-applied substances for all and/or a majority of its seed (for example, this is typical with corn). For these and other reasons, the present disclosure also contemplates farmers selecting a combination of seed and seed-applied substances where one or more of the seed-applied substances are applied to one or more seeds prior to the planting operation and one or more seed-applied substances are applied to one or more seeds during the planting operation.

One primary object of the present disclosure is to reduce the potential negative dust off, off target or other environmental or other sustainability impacts that may result from planting seeds with seed-applied substances. Pursuant to some embodiments of the present disclosure, neonicotinoid dust off potentially could be reduced if such substance was not applied to seeds prior to loading them onto the planter 10. However, some seed and/or chemistry companies and other industry participants have suggested that neonicotinoid seed-applied substances can have strong yield and/or other benefits. Thus, it is another objective of the present disclosure to enable the potential benefit of neonicotinoid seed-applied substances while reducing the potential harm from dust off incurred during the pre-planting seed loading operation. In some embodiments, this could be accomplished by applying the neonicotinoid seed-applied substances during the planting operation (e.g., in one of the many ways described herein or as otherwise consistent with the present disclosure) rather than loading seeds pre-treated with neonicotinoids onto a planter.

Further, while a blower and/or other drying mechanism could potentially be used in combination with various aspects of the present disclosure, many embodiments of the present disclosure do not necessarily need the use of a blower or other drying mechanism to dry the seed-applied substances for many reasons, examples of some of which are discussed above and examples of some of which are set forth below. For example, in embodiments where one or more substance applicators 42 are located in one or more seed meters 26 or seed drop tubes 28, the seeds typically have been singulated and no longer come in contact with any other seed in the seed flow path, such that the need to blow or otherwise dry them to avoid clumping or otherwise is significantly reduced. Similarly, in embodiments with very precise and accurate substance applicators, the amount of seed-applied substances (e.g., active ingredients) necessary to accomplish its desired impact (e.g., fighting diseases for a fungicide) can be potentially reduced, such that the amount of seed-applied substances to be applied to the seeds during the planting process could be decreased, which in turn typically allows such seed-applied substances to dry quicker as they travel through the seed flow path.

Another primary object of the present disclosure is to prescriptively select a combination of seed and/or seed-applied substances to be planted. As previously expressed herein, one exemplary method of doing so is through applying one or more of the seed-applied substance(s) during a planting operation. Another exemplary method of doing so is by applying the one or more substances to a seed prior to the seed being loaded onto a planter 10 and prescriptively selecting, from the loaded seed during the planting operation, the desired seeds having the desired one or more seed-applied substances for planting.

Some embodiments involving pre-treated seed that is loaded onto the planter 10 before the planting operation can be described by referring to the planter 10 of FIG. 1B. For example, the bins 20 can be loaded prior to the planting operation to contain some combination of one or more seeds of one or more seed types (e.g., one or more hybrids and/or varieties) treated with one or more seed-applied substances where one or more seed-applied substance(s) can be applied prior to loading the bins 20 with the seeds. Many different methods of pre-treating seeds with seed-applied substances and/or loading them onto a planter 10 can be used, and most of those methods are commonly known in the art and/or are readily apparent in light of the structure of the applicable seed type and/or planter 10. The present disclosure contemplates any combination of seeds and seed-applied substances. In one particular example, a portion and/or batch of the seeds can be treated in bulk with an insecticide, a fungicide and an inoculant, another portion and/or batch of the seeds can be treated with just a fungicide and another portion and/or batch of the seeds can be treated with just an insecticide. Each of these batches of seeds can be loaded into one or more of the bins 20. In some embodiments, each of the bins 20 can contain a different combination of seed and seed-applied substance(s), but multiple bins 20 can contain the same combination of seed and seed-applied substance(s) in other embodiments. Based, at least in part, on one or more conditions, a combination of seed and seed-applied substance(s) can be selected from the different combinations of seed and seed-applied substance(s) in many different ways, but is most often accomplished by one or more controllers, the details of some examples of which will be discussed below.

One or more controllers can operate many different components in the present disclosure. Here, for example, one or more controllers can operate components associated with the bins 20 to deliver the selected combination from the bins 20 through the seed flow path (e.g., to one or more row units 16 of the planter 10), after which it can be dispensed and planted consistent with the present disclosure previously discussed herein. The selected combination of seed and seed-applied substance can be based, at least in part, on any planting condition(s), but the selection typically will take into account at least the type of the seed, the type of the seed-applied substance(s), and/or the application rate of the seed-applied substance(s). Keeping with the example discussed above, if a particular row and/or other location does not need any fungicide and/or inoculant, but could benefit from a particular type of seed (e.g., a particular hybrid and/or variety) treated with just an insecticide, one or more controllers could cause one of the bins 20 containing such combination of seed and insecticide to dispense a seed and cause it to be delivered through the seed flow path and be planted. In some embodiments, the selected combination could be dispensed from a particular seed bin 20, delivered via a seed delivery tube 40 to the row unit 16 corresponding with where the seed is to be planted. In some such embodiments, the seed will go through a seed hopper 24, one or more seed meters 26 and a seed drop tube 28 prior to being planted at the desired location, which is typically a location in a furrow in a field. However, if, in such example, a particular row and/or other location benefits from a particular type of seed treated with an insecticide, fungicide and an inoculant, one or more controllers could cause one of the bins 20 containing such combination of seed and insecticide, fungicide and inoculant to dispense a seed and be delivered through the seed flow path and be planted.

In embodiments where only one bin 20 contains all of a particular combination of seed and seed-applied substance(s), that particular bin 20 will always be selected when such combination is selected. However, in embodiments where more than one bin 20 contains a particular combination of seed and seed-applied substance(s), the selection from amongst the multiple bins 20 containing the combination can be performed in many different ways. For example and referring to FIG. 2A, in some embodiments, each row unit 16 could have its own bin 20, set of bins 20 (and/or one or more partitioned bins) having all possible combinations of seed and seed-applied substances. In such embodiments, the selection of the appropriate bin 20 typically will correspond to the bin 20 that is associated with the row unit 16 where the combination is to be planted. However, it is possible to have some bins 20 that deliver a particular combination of seed and seed-applied substances to more than one row unit 16, but not all row units 16 on the planter 10. In some of such embodiments, the bins 20 could have multiple seed delivery tubes 40 that connect to multiple different row units 16.

Additionally, in some embodiments, it is possible for one or more row units 16 to be capable of receiving one or more combinations of seeds and seed-applied substance(s) from more than one bin 20. In some of such embodiments, the bins 20 could have multiple different seed delivery tubes 40 and typically would have one seed delivery tube 40 for each row unit 16 to which it is configured to deliver the relevant combination of seed and seed-applied substance(s). In some embodiments, one or more controllers could be used to control various functions, including which of the possible bins 20 containing the selected combination of seed and seed-applied substance(s) should deliver the combination (typically to a particular row unit 16) and through which seed delivery tube 40 such combination should be delivered. In some embodiments, the selection of which of multiple possible bins 20 to deliver the seed could be based, at least in part, on the inventory levels of the combinations of seed and seed-applied substance(s) in the applicable potential bins 20.

Figure 9:
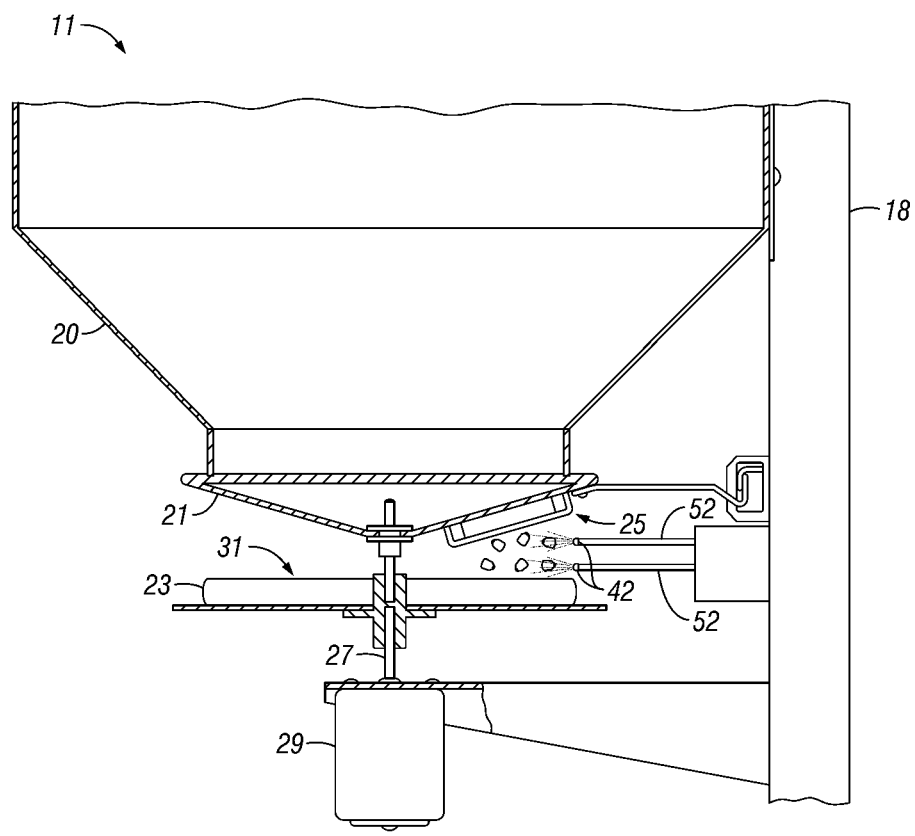
FIG. 9 is a schematic view of another planter implement system in accordance with an illustrative embodiment.

In lieu of or in addition to the bins and/or seed receptacles 20 of FIG. 9, the planter 10 can be comprised of one or more partitioned bins and/or seed receptacles 20. Each partition of such bin 20 can receive a particular combination of seed type and/or seed-applied substance and function similarly to that described above in connection with bins 20 having only one compartment and containing only one combination of seed and seed-applied substance. For example, based, at least in part, on the absence and/or presence of one or more conditions, one or more controllers can select a combination of seed type and seed-applied substance and cause the appropriate partition of the bin 20 to dispense the selected combination and then be planted, and the dispensing of the selected combination of seed and seed-applied substance(s) can be accomplished through any means commonly known in the art, including methods previously expressed herein.

Similar to as described above, the exemplary embodiment of pre-treating seeds and prescriptively selecting a combination of seed and seed-applied substances can be used in lieu of and/or in addition to the exemplary embodiment of applying the seed-applied substance during the planting operation. In other words, in an instance where one, more than one, and/or all of the bins 20 are loaded with seed pre-treated with one or more seed-applied substances, the planter 10 can also apply one or more seed-applied substances within the seed drop tube 28 (and/or other components in and/or proximate to the seed flow path) during operation of the planter 10 consistent with the methods previously discussed herein.

A primary object of the present disclosure is to generate a prescribed combination of seed type and seed-applied substance prior to planting based, at least in part, on one or more conditions. The present disclosure contemplates that the prescribed combination can be generated in many different ways.

In some embodiments, generating a combination of seed and seed-applied substance for planting at a particular location based, at least in part, on one or more planting conditions, can be correlated to a particular farmer's objectives and sometimes a prioritization of those objectives. For example, a particular farmer's objectives can vary greatly, but many farmers' objectives are yield optimization, yield and/or other risk mitigation, and/or financial and/or operational considerations. Many farmers focus solely on and/or otherwise prioritize yield potential and/or optimizing yield. In some cases, farmers can accomplish this objective, at least in part, by selecting the inputs that potentially have a high (and preferably the highest) yield potential under the predicted and/or most common circumstances. By way of example, a farmer could focus on yield potential and/or optimizing yield by selecting a seed type that has the highest yield potential for a particular location under common weather (e.g., temperature, wind and rain) conditions for the location even if that seed type may have very poor performance under other conditions (e.g., under extreme drought and/or flooding conditions that typically don't occur very often). Similarly, a farmer could focus on yield potential and/or optimizing yield by selecting the amount and/or types of seed-applied substance(s) that provide the highest yield potential for a particular location under common insect, disease and other pest conditions for the location even if that amount and type of seed-applied substance(s) may have very poor performance under other conditions (e.g., under extreme (high and/or low) disease, insect and/or other pest pressures). In some embodiments, if a farmer's only objective is to optimize yield, then the selected combination of seed and amount and/or type of seed-applied substance(s) can be based, at least in part, on data and/or experience concerning which particular combination could provide the highest potential yield under the predicted and/or most common circumstances, and such determination typically can be by individual location, zone, region, field and/or across multiple fields and/or farming operations. Thus, in some embodiments, yield potential and/or optimization can be an objective that may influence which conditions to be taken into consideration, at least in part, when selecting which combination of seed and seed-applied substances to plant in a particular location.

In some instances, other objectives may drive a farmer's decisions. By way of illustration, a particular farmer may be more risk adverse and could focus solely on and/or prioritize mitigating risk in many different ways. In some cases, a particular farmer may want to even out the cyclical and dynamic nature of the annual farming business. For example, field, weather and other conditions can vary drastically year to year from farm to farm and even within a farm. These variations can have a dramatic impact on the success of a farmer, and sometimes certain conditions may be more influential than others. By way of example, certain extreme field (e.g., disease, insects and other pests) and/or weather (e.g., extreme drought and/or flooding and/or wind) conditions can dramatically negatively impact yield for certain combinations of inputs, but it may not have as much impact on other combinations of inputs (though those combinations of inputs may not have as high of a yield potential under common and/or predicted conditions). In some situations, a particular farmer may want to mitigate the risk of having a very poor yield (or not making a net profit) and desire the combination of inputs that will increase the likelihood of maintain a certain level of yield regardless of the weather, field and/or other conditions that particular year. In some embodiments, if a farmer's objective is to mitigate risk, then the selected combination of seed and amount and/or type of seed-applied substance(s) can be based, at least in part, on data and/or experience concerning which particular combination could provide a high likelihood (preferably the highest likelihood) of obtaining a particular level of yield under many different possible circumstances even if such combination may not have as high of a yield potential under common and/or predicted conditions, and such determination can again be at the individual location, zone, region, field, multiple field and/or farming operation level. By way of example, the combination selected for some more risk adverse farmers could be a more durable hybrid and/or variety seed treated with a relatively higher amount of fungicide and/or insecticide than would otherwise be projected to provide the highest yield potential and/or the best return on investment. Thus, in some embodiments, risk mitigation can be an objective that may influence which conditions to be taken into consideration, at least in part, when selecting which combination of seed and seed-applied substance(s) (e.g., type and/or amount) to plant in a particular location.

In addition to yield potential and risk mitigation, some farmers may focus on and/or prioritize financial (e.g., reducing and/or minimizing costs, optimizing profits and/or the like) and/or other operational considerations (e.g., inventory management, sustainability, land and/or water use, long term effectiveness of active ingredients and/or traits, labor considerations and/or the like) when making decisions. In some situations, a particular farmer may not look just to yield potential, but may weigh yield potential against the potential costs for obtaining such yield potential, and typically such a farmer can attempt to increase and/or optimize profitability of the farm operation by selecting the type and amount of inputs and other consideration that are projected to net higher and preferably the highest profit. By way of example, a particular farmer may discern how much potential yield benefit many different types of seed (e.g., hybrids and/or varieties), seed-applied substances and other inputs have, compare the potential yield benefits of such seeds and seed-applied substances and their projected revenues (e.g., by projecting increased bushels per acre and/or hectare and multiplying them by projected commodity prices of the relevant crop) to the relative costs of such combination to make decisions on which seeds and the type and/or amount of seed-applied substance(s) to purchase and/or plant. In some embodiments, if a farmer's only objective is profit potential and/or optimization, then the selected combination of seed and amount and/or type of seed-applied substance(s) can be based, at least in part, on data and/or experience concerning which particular combination could provide the highest potential profit under the predicted and/or most common circumstances, and while such determination typically can be at the individual location, zone, region, field and/or across multiple fields and/or farming operation level, it preferably is at the farming operation level.

Further, a particular farmer may already have a pre-existing inventory of an input (e.g., seed and/or seed-applied substance) from prior growing seasons and/or from other operations. In some situations, a particular farmer may want to use such inventory prior to it becoming non-viable and/or otherwise not being appropriate for planting. In some embodiments, a farmer may make decisions based, at least in part, upon conditions that impact the level of existing seed and/or seed-applied substance(s) inventories. Notably, in some embodiments, once pre-existing inventories are used up, a different objective and/or prioritization could be employed.

For another example, a particular farmer may wish to be able to run its farm operations in a manner that could be considered and/or qualify as organic, non-GMO and/or more sustainable, land and/or water use efficient and/or the like. In fact, in some situations, farmers may even be financially and/or otherwise incented and/or legally and/or otherwise obligated to do so. Thus, in some situations, a particular farmer may select and/or prioritize inputs that decrease and/or eliminate the use of technologies sometimes having negative connotations in the market (e.g., GMO traits, chemistries and/or other substances alleged to have negative impacts on non-target organisms and/or water quality and/or the like) and/or qualify for statuses including non-GMO and/or organic. Some farmers may select either lesser amounts of and/or different types of inputs than other objectives (e.g., yield potential and/or optimization, yield and/or other risk mitigation and/or net profit potential and/or optimization) may otherwise suggest. In some such embodiments, the selected combination of seed and amount and/or type of seed-applied substance(s) can be based, at least in part, on data, knowledge and/or experience concerning which particular combination could decrease and/or eliminate the use of technologies sometimes having negative connotations in the market and/or qualify for statuses (including non-GMO and/or organic) and select either lesser amounts of and/or different types of seeds and/or seed-applied substances than other objectives would suggest, and such determination typically can be at the individual location, zone, region, field and/or across multiple fields and/or farming operation level, but preferably would be at a level where the farmer can track its compliance with relevant governmental, NGO and/or other standards. By way of example, a particular farmer could choose to use biological insecticides rather than chemistry-based neonicotinoid class insecticides, which have been claimed by some to impact bee health. Similarly, a particular farmer could just decide to use a lower rate of neonicicotinoid class insecticides for the same and/or other reasons.

Thus, in some embodiments, net profit potential, other financial considerations, inventory management, sustainability and/or other operational considerations can be objectives that may influence which conditions to be taken into consideration, at least in part, when selecting which combination of seed and seed-applied substances (e.g., type and/or amount) to plant in a particular location, and such determination typically can be at the individual location, zone, region, field and/or across multiple fields and/or farming operation level. The selected combination can vary on a field-by-field, region-by-region, row-by-row, column-by-column, zone-by-zone, batch-by-batch, and/or seed-by-seed basis.

Furthermore, in some embodiments, a particular farmer can use an approach comprising any combination of the above strategies. For example, a particular farmer could take multiple of the above-described objectives into account when determining which conditions should be used, at least in part, when making selection decisions, and such a farmer could use a weighting and/or other prioritization system to be able to make decisions when the various objectives conflict and/or do not correlate easily. In some embodiments, prioritization of objectives and/or conditions could be preset by an algorithm and/or system, but in other embodiments it could be input and/or adjusted by a farmer and/or other entity at certain times (e.g., during set up, loading the planter and/or the like), periodically and/or regularly. Similarly, in some embodiments, the prioritization can be the same for the entire planting operation, but in other embodiments the prioritization can be adjusted (e.g., automatically by an algorithm and/or system, manually by a farmer and/or other user and/or otherwise) at any time (e.g., real-time, in between planting operations and/or otherwise). The selection criterion can be as simple (e.g., planting date and available seeds and/or seed-applied substances) and/or complex (e.g., a multi-objective approach that prioritizes the objectives depending on the field and/or location and thus adjusts the numerous conditions to be considered and the prioritization thereof as the planter goes through the field) as possible.

In an exemplary embodiment, a particular farmer could use and/or prioritize a yield and/or net profit potential and/or optimization strategy in regions of the field with the best soil types with historically consistent yields (e.g., typically low disease, insect and/or other pest pressure and otherwise low yield variability risk) and a risk mitigation strategy in regions of the field associated with increased risks (e.g., poor draining soil types, low and/or wet areas and/or otherwise high moisture levels and thus, typically higher insect, disease and/or other pest pressures, etc.).

As discussed above, many different conditions can be used in the seed-by-seed-applied-substance combination selection process in various different embodiments, and there are many ways that the various conditions can be measured, captured and/or otherwise assessed, including through records, sensors, gauges, monitors and the like, any of which can be located in many locations, including in and/or around the field, comprising and/or associated with satellite, drone and/or aerial devices, comprising and/or associated with devices that pass through, over and/or around the field, and wearable, mobile and/or other digital and/or electronic devices. Moreover, conditions can be measured, captured and/or otherwise assessed based, at least in part, on prior (e.g., inputted and/or other pre-existing data and/or information), real-time and/or predictive and/or other analytical means. For example, geographical locations (e.g., of the system and/or one or more planting locations) can be based, at least in part, on many different sources, including visual observation, GPS coordinates, (e.g., historic, predictive and/or real-time GPS coordinates) and/or prescription field maps. Similarly, some soil, water, moisture, disease, insect, other pest and other field-related measurements can be obtained through many ways, including visual observation, historical records and/or knowledge, and soil and/or other field sampling (including periodic core and other sampling and in-field, pass-over, aerial and/or other real-time sensors).

In some embodiments, certain conditions can impact which seed a particular farmer may select for a particular location. By way of example, some conditions may impact what crop, hybrid and/or variety and/or native and/or transgenic traits to select. For example, if certain conditions indicate and/or suggest a higher level of a particular disease, insect, nematode and/or other pest pressure and/or low nitrogen levels, then some embodiments may cause seeds with native and/or transgenic traits relevant to the same to be selected. By way of example, if certain conditions indicate an increased presence or likelihood of corn rootworm (CRW), then some embodiments may select crops other than corn and/or corn hybrids with one or more transgenic and/or other modes of action against CRW, and some conditions indicating or predicting extremely high levels of CRW may cause certain embodiments to select corn hybrids with two or more transgenic and/or other modes of action against CRW. Similarly, if certain conditions indicate certain highly productive soil types (e.g., silt and/or other loam and/or the like), then some embodiments may select hybrids and/or varieties with the highest yield potential; but if certain conditions indicate certain less productive soil types (e.g., sand, clay and/or the like), then some embodiments may select hybrids and/or varieties with more defensive native and/or transgenic traits (e.g., disease and/or insect tolerance and/or resistance). While not exhaustive, Table 1 reports various potential exemplary conditions, ways to measure such conditions and potential actions related to selecting a combination of seed and seed-applied substance(s) that are contemplated by the present disclosure. In some embodiments, Table 1 and/or portions thereof could be used, at least in part, in the selection of the combination of seed and seed-applied substances to be planted at a particular location, and the selection of which condition(s) to use, how to measure them, the relative weighting and/or prioritization of them and how they impact the selection of the combination of the seed and seed-applied substance(s) can vary from embodiment to embodiment.

TABLE 1

Prescriptive Seed Treatment(s) for Measured Conditions

| Potential Condition | Potential Ways to Measure | Potential Actions Taken in Response to Presence of Condition |
|---|---|---|
| Dry Soil | Soil moisture gauges and/or sensors; soil sampling; aerial, visual and/or other observation; weather forecast, | Select seeds with better emergence in dry soil; select high vigor seeds; apply water; increase amount of water applied to seed; apply fungicides, insecticides, plant growth promoters and/or inoculants; increase the rate and/or number of the fungicides, insecticides, plant growth promoters and/or inoculants. |
| Cold Soil | Soil temperature gauges and/or sensors; soil sampling; ambient air temperature gauges and/or sensors with soil temperature conversions; aerial temperature observations; weather forecasts; early season and/or colder region planting; high crop residue in field. | Select seeds with better native and/or transgenic disease resistance traits; apply fungicides and/or insecticides; and/or increase the rate and/or number of fungicides and/or insecticides; apply brady rhizobium, plant growth promoters, and/or other inoculant and/or increase the rate and/or number of the same. |
| Wet Soil | Soil moisture gauges and/or sensors; soil sampling; aerial, visual and/or other observation, weather forecast; soil type; field terrain; tiling in the field; knowledge of prior flooding zone. | Select seeds with better native and/or transgenic disease resistance traits; apply fungicides and/or increase the rate and/or number of fungicides. |
| Wet Then Dry Soil | Soil moisture gauges and/or sensors; soil sampling; aerial, visual and/or other observation, weather forecasts; knowledge of soil type; field terrain; tiling in the field; knowledge of prior flooding zone. | Select seeds with better native and/or transgenic Rhizoctina resistance traits; apply Rhizoctonia fungicides and/or increase the rate and/or number of the Rhizoctonia fungicides. |
| Chemical Residue Levels | Soil chemistry gauges and/or sensors; soil sampling; knowledge of past years' chemical application rates. | Apply safeners, fungicides, plant growth promoters, and/or inoculants, and/or increase the rate and/or number of the same. |
| Mild Winters | Knowledge of past seasons' temperatures, wind chills and precipitation. | Select seeds with better native and/or transgenic insect resistance traits; apply insecticides, and/or increase the rate and/or number of insecticides. |
| Insect Pressure | Soil sampling (e.g. pheromonebaited traps), gauges and/or sensors. | Select seeds with better native and/or transgenic insect resistance traits (can vary depending on the insect and the level of pressure); apply insecticides, and/or increase the rate and/or number of insecticides. If high levels of CRW, apply fungicides (e.g., root rot) and/or increase the rate and/or number of fungicides. |
| Early Vegetation In and/or Near Field | Knowledge of vegetation (e.g., sod/grass, weeds, soy/small grains) in adjacent and/or nearby fields and/or prior year's crops in the field to be planted; aerial, visual and/or other observation; soil/in-field gauges and/or sensors. | Select seeds with better native and/or transgenic insect resistance traits; apply insecticides, and/or increase the rate and/or number of insecticides. |

TABLE 1-continued

Prescriptive Seed Treatment(s) for Measured Conditions

| Potential Condition | Potential Ways to Measure | Potential Actions Taken in Response to Presence of Condition |
|---|---|---|
| Monoculture | Knowledge of prior year's crops planted in the same field. | Select seeds with better native and/or transgenic insect, disease and nematode (e.g., Soybean Cyst Nematode (SCN) for soybeans) resistance and/or nitrogen use efficiency (NUE) traits; apply fungicides, insecticides and/or nematicides and/or increase the rate and/or number of the same. Apply brady rhizobium, plant growth promoters, inoculant and/or other nitrogen fixing bacteria, biologicals, and/or other materials and/or increase the rate and/or number of the same. |
| High Crop Residue | Knowledge of the farm management practices, crops, and/or level of crop residue; aerial, visual and/or other observation; soil gauges and/or sensors; soil sampling; residue sampling. | Select seeds with better native and/or transgenic insect, disease and nematode resistance and/or NUE traits; apply fungicides, insecticides and/or nematicides and/or increase the rate and/or number of the same. Apply brady rhizobium, plant growth promoters, inoculant and/or other nitrogen fixing bacteria, biologicals, and/or other materials and/or increase the rate and/or number of the same. |
| High Temperature and Humidity During Seed Storage | Knowledge of seed storage conditions, including temperature, moisture and insect levels. Knowledge of whether germination and/or vigor of seeds are still acceptacle. | Apply fungicides, plant growth promoters, inoculants and/or increase the rate and/or number of the same. If seed grain insect levels are high, apply insecticides and/or increase the rate and/or number of the same. |
| Aggressive Handling of Seed Prior to Planting | Knowledge of seed handling practices. Knowledge of whether germination and/or vigor of seeds are still acceptacle. | Apply fungicides, plant growth promoters, inoculants and/or increase the rate and/or number of the same. If seed grain insect levels are high, apply insecticides and/or increase the rate and/or number of the same. |
| Low Seeding Rate | Seeding rate sensor. Knowledge of productivity history of particular zones of field. Knowledge of seeding rate of equipment and/or prescription algorithm. | Select lower cost seeds; select higher yielding seeds; apply fungicides, insecticides, nematicides, plant growth promoters, inoculants and/or other seed treatment actives, and/or increase the rate and/or number of the same. |
| Inconsistent Planting Depth | Planting depth sensors; knowledge of past years' planting depth. | Apply fungicides, plant growth promoters, and/or inoculants, and/or increase the rate and/or number of the same. |
| Sandy Soil and/or High Level of Nematodes | Soil sampling, gauges and/or sensors for nematode levels; knowledge of soil types; weather forecasts, | Select seeds with better native and/or transgenic nematode resistant and/or NUE traits; apply nematicides and/or increase the rate and/or number of the same; apply and/or include brady rhizobium, plant growth promoters, inoculant and/or other nitrogen fixing bacteria, biologicals and/or other materials and/or increase the rate and/or number of the same. |
| Spring-applied Manure | Knowledge of farm management practices. | Select seeds with better native and/or transgenic insect resistant traits; apply insecticides, and/or increase the rate and/or number of the same. |
| Corn Planted Two Years After Pasture | Knowledge of farm management practices. | Select seeds with better native and/or transgenic insect resistant traits; apply insecticides, and/or increase the rate and/or number of the same. |
| Corn Planted After Pasture | Knowledge of farm management practices. | Select seeds with better native and/or transgenic insect resistant traits; apply insecticides, and/or increase the rate and/or number of the same. |
| Field Adjacent to Cottonwood and/or Willow Trees | Knowledge of adjacent fields. | Select seeds with better native and/or transgenic insect resistant traits; apply insecticides, and/or increase the rate and/or number of the same. |
| Cool Spring Forecast | Weather forecasts. | Select seeds with better native and/or transgenic insect resistant traits; apply insecticides, and/or increase the rate and/or number of the same. |
| Nitrogen Deficiency | Soil sampling; soil nitrogen gauges and/or sensors; aerial and/or other observation, | Select seeds with better native and/or transgenic NUE traits; apply and/or include brady rhizobium, plant growth promoters, inoculant and/or other nitrogen fixing bacteria, biologicals and/or other materials and/or increase the rate and/or number of the same. |
| Minimal Fertilizer Applied, Heavy Rainfall after Fertilization, and/or Saturated Soils | Knowledge of farm management practices; moisture gauges and/or sensors; weather pattern data for rainfall; knowledge of soil types; soil sampling gauges and/or sensors. | Select seeds (e.g., hybrids) with better native and/or transgenic NUE traits; apply nitrogen fixing bacteria, biologicals and/or other materials and/or increase the rate and/or number of the same; apply brady rhizobium and/or other inoculant and/or increase rate and/or number of the same. |
| Potassium Deficiency | Soil sampling, gauges and/or sensors, | Apply and/or include phosphorus and/or increase the rate of the same. |

TABLE 1-continued

Prescriptive Seed Treatment(s) for Measured Conditions

| Potential Condition | Potential Ways to Measure | Potential Actions Taken in Response to Presence of Condition |
|---|---|---|
| Early Planting Date | Knowledge of farm management practices, current growing season weather conditions and local weather patterns; weather pattern data and forecasts. | Select seeds with later maturity; select seeds with better native and/or transgenic disease resistance traits; apply fungicides; and/or increase the rate and/or number of fungicides; apply brady rhizobium and/or other inoculants and/or increase the rate and/or number of them. |
| Late Planting Date | Knowledge of farm management practices, current growing season weather conditions and local weather patterns; weather pattern data and forecasts. | Select seeds with earlier maturity; decrease the rate and/or number of fungicides; decrease the rate and/or number of brady rhizobium and/or other inoculants. |

In some embodiments, the system can generate and/or select a prescribed combination of seed and seed-applied substance(s) prior to planting based, at least in part, on one or more conditions in many ways, including through the use of one or more controllers. For example, one or more controllers could store default settings and/or allow a particular farmer to change (e.g., regarding that farmer's objectives) the settings. One or more controllers could also store and/or perform an algorithm that can prioritize, based at least in part on the farmer's objectives, the conditions and/or the actions to take based, at least in part, on those conditions. Similarly, one or more controllers could store pre-existing and/or predictive data; gather and/or assess real-time data; and/or analyze predictive information and/or data related to the relevant conditions. One or more controls could use the relevant information and/or data to perform the algorithm that can select the prescribed combination of seed and seed-applied substances. Further, one or more controllers could communicate with the applicable other components of the planter and/or control them to generate the combination in many different ways depending on the particular embodiment. By way of example, one or more controllers could determine which seed bin should deliver the selected seed and/or could communicate with such seed bin and/or trigger such seed bin to deliver one or more seeds through the seed flow path. In some embodiments, one or more controllers could control one or more timing mechanisms that can be used to synchronize the delivery of the seed through the seed flow path in an effort to plant the seed at the desired location. In embodiments where one or more seeds can receive seed-applied substances during the planting operation, one or more controllers could determine the types and amounts of seed-applied substances to apply to the seed and/or which one or more substance applicators to apply a seed-applied substance(s). Similarly, one or more controllers could determine which substance receptacle (and potentially which compartment within the substance receptacle) should deliver the prescribed seed-applied substance(s). One or more controllers could communicate with a substance receptacle and/or control one or more metering devices to cause the appropriate amount(s) of such seed-applied substances to be delivered through the substance flow path to the appropriate substance applicator(s). In some embodiments, one or more controllers could control one or more timing mechanisms that can be used to synchronize the delivery of the applicable seed-applied substance(s) through the substance flow path. Doing so is one way to enable the applicable substance applicator(s) to apply the prescribed seed-applied substance(s) to the seed at the proper time so that the combination can be planted at the desired location. Further, one or more controllers could control the applicable substance applicator(s) to apply the selected type and/or amount of seed-applied substance(s) to the selected seed at the calculated time so the combination can be planted at the proper location. One or more controllers could also control any pumping and/or other substance delivery mechanisms. One or more controllers could control any mixing devices to mix the applicable seed-applied substances in a manner to be applied to the applicable seed by the applicable substance applicator(s). The present disclosure contemplates that one or more controllers can control any other component(s) of the system, including but not limited to, the seed hopper, the seed meter, the one or more accelerator belts, and the flushing mechanism(s), as previously discussed herein. Furthermore, the present disclosure contemplates being able to interoperate with existing planter/planting, farm management, prescription management and other agriculture software, hardware, firmware and other systems farmers use in their daily farm operations, and one or more controllers could be used to interoperate with such. In some embodiments, one or more algorithms can be used to direct one or more of the actions of one or more controllers.

In addition to those set forth above, the present disclosure contemplates that one or more controllers could be used with many other features and/or components of the system and typically could be used to cause many of the various system functionalities discussed throughout this disclosure to occur. Regardless of the feature or functionality, one or more controllers can be of many different types, including a programmable logic controller (PLC) and any other mechanism capable of receiving digital, electronic and/or mechanical inputs and causing actions to occur based, at least in part, thereon, including adjusting, activating, deactivating and/or moving nozzles, orifices, gates, wheels, levers, dividing mechanisms, pumping mechanisms, metering mechanisms, spraying or other substance dispensing mechanisms, and/or vacuums and/or other pneumatic mechanisms. In some embodiments, one or more controllers can be located in various locations within and/or proximate to the planter (e.g., in the cab of the tractor). In some embodiments, one or more controllers could be wearable and/or other mobile devices capable of use in the planter and/or other locations. In some embodiments, one or more controllers could even be located remotely from the planter, including home, farm and/or office computers. In some embodiments, one or more controllers may interoperate with other controllers and/or systems, including those related to other aspects of the planting operation and/or other farming operations.

Further, in some embodiments, the planter 10 can be a broadcast planter, which may not have any row units. An exemplary broadcast planter 11 is illustrated in FIG. 9. In some broadcast embodiments, seeds will be stored in a seed bin 20. In an exemplary embodiment, a seed-applied substance can be applied to the seed prior to loading the seed into the seed bin 20 via the methods previously discussed. The seed bin 20 can be of any suitable size and shape so as to supply seeds to a desired region or field. In the exemplary embodiment illustrated in FIG. 9, a portion of the seed bin 20 is a frustum of a cone so as to funnel the seeds to the base 21 of the seed bin 20. The seeds can be transferred to one or more metering wheels 23 and/or other insertion and/or dispersion devices typically via one or more slide gates 25. Further, in some broadcast embodiments, the applicable metering wheel(s) 23 and/or other seed insertion and/or dispersion device(s) plant the seed by spraying the seeds (typically a group of seeds at the same time). The metering wheel(s) 23 can be rotated on a rotor 27 by a motor 29, after which the seeds can collide with the metering wheel(s) and disperse.

In some broadcast embodiments, while the substance applicators 42 can be located anywhere along the seed flow path, they preferably would be located at and/or proximate to one or more slide gates 25 and/or metering wheels 23. For example, one or more substance applicators 42 and/or substance delivery tubes 52 could be situated to apply the seed-applied substances to one or more seeds as they leave one or more slide gates 25 and/or as they leave one or more metering wheels 23. Any of the configurations of substance applicators 42 and/or substance delivery tubes 52 previously expressed herein (e.g., illustrated in FIGS. 6A-7C) can be incorporated into the broadcast planter 11. Further, a substance chamber 68 (FIG. 8B) can be incorporated proximate to the slide gate(s) 25 and/or metering wheel(s) 23 to control and/or recycle any seed-applied substance not applied to the seeds.

In further broadcast embodiments, the broadcast planter 11 can have a plurality of substance applicators 42 configured to apply substance(s) to the seeds while briefly positioned on (i.e., in contact with or proximate to) the metering wheel 23. The metering wheel 23 can have a plurality of radial fins creating a plurality of radial slots 31 within the metering wheel 23. Each of the plurality of substance applicators 42 can be associated with one of a plurality of radial slots 31 extending outwardly from a center of the metering wheel 23. In such a configuration, one or more seed-applied substances can be applied to portions of the metering wheel 23. In some embodiments, an algorithm could be used to approximate where each seed will land within a broadcast radius and/or use such to calculate a planting location.

Though the present disclosure contemplates many embodiments as is evident from the above description, two additional examples of how the system could operate are provided below. However, the examples described below are merely illustrative and not intended to limit the present disclosure in any way.

Figure 10:
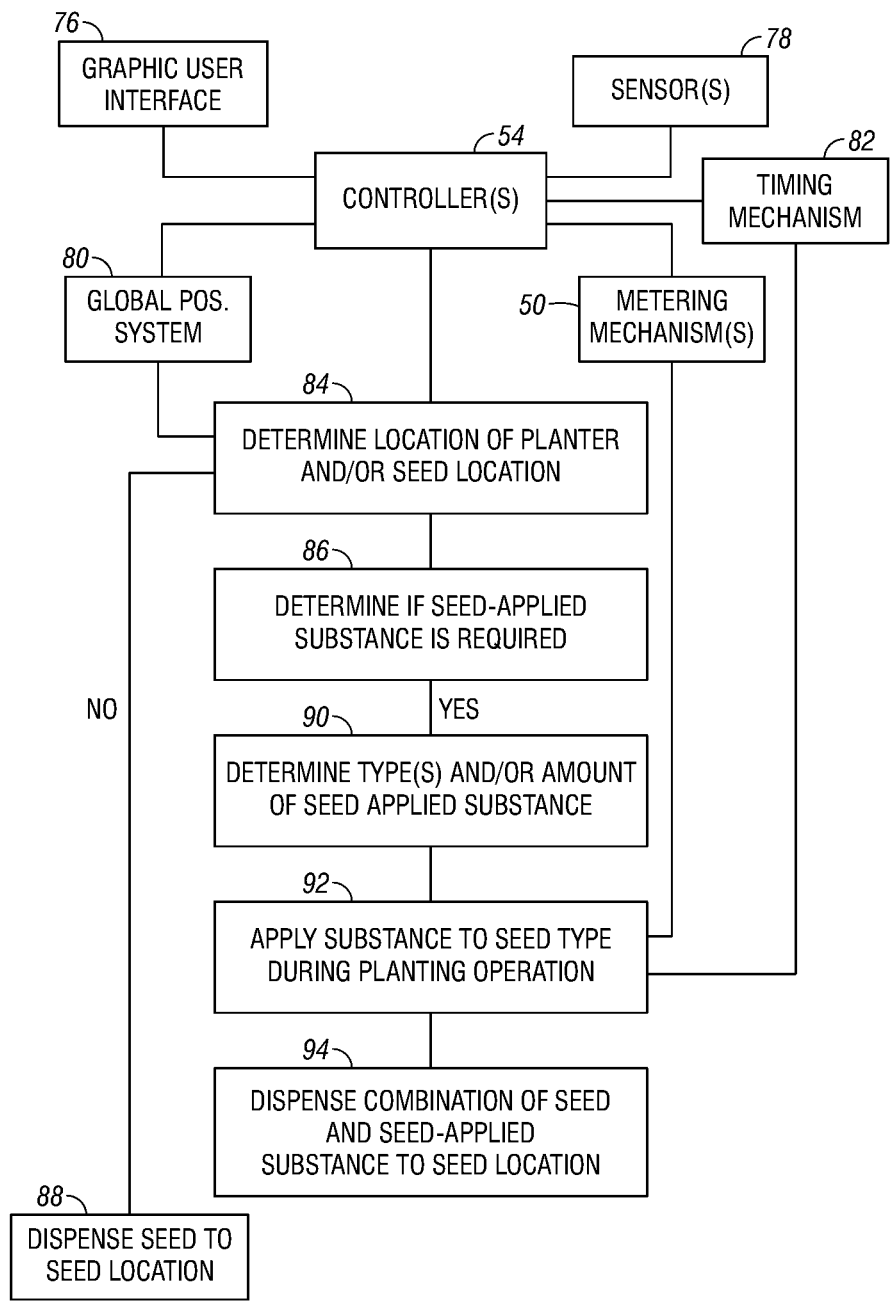
FIG. 10 is a block diagram providing a pictorial representation for a method of operation of a planter implement system in accordance with an illustrative embodiment.

Referring to FIG. 10, another exemplary method for performing some of the objects of the present disclosure is illustrated. One or more controllers 54 can be operably connected to one or more graphic user interfaces (GUI) 76 such as a display monitor, laptop computer, desktop computer, tablet, and/or any other wearable, handheld, mobile and/or related digital, electronic or mechanical device. The applicable GUI's 76 can be preferably located and/or be capable of being operated within the cabin of the tractor 12, but can be located at any location on and/or even remote from the planter 10 without deviating from the objects of the present disclosure. The applicable GUI's 76 can receive data and/or information (e.g., directions, instructions and the like) from the farmer, including inputs related to one or more of the measured and/or known conditions and can transmit the applicable input to the applicable controller(s) 54. As previously expressed herein, the input can be many different types of information and/or data, including a prescription map of the field and any number of other conditions associated with the planting operation. For example, based, at least in part on previous soil sampling and/or otherwise, the farmer could input that a certain portion of the field is associated with nitrogen deficiency. For another example, a farmer could input a list of different combinations of seed and seed-applied substances associated with each of the plurality of bins (or portions of a partitioned bin). The applicable controller(s) 54 can also use inputted and/or acquired information and/or data, including commodity and/or other market conditions, and the like, inputted prior to and/or updated during the planting operation. Any of such inputs could be manually provided by a farmer and/or could be obtained otherwise, including via digital, electronic, mechanical and/or other access to public and/or private sources of static and/or dynamic data and/or information relevant to the applicable conditions.

Similarly, the applicable controller(s) 54 can use data and/or information gathered by one or more measuring devices, including sensors 78, field sensors and/or by observations of the farmer during the planting operation. The sensor(s) 78 can be based at least in part on inputted and/or predictive data and/or information and/or based at least in part on real-time and/or predictive sensors. The field sensors can be located in many different locations, including in, above and/or otherwise around the field. The field sensors can comprise and/or be associated with many different devices, including satellite, drone and/or other aerial devices, and/or devices that pass through, over and/or around the field. The sensors and/or field sensors can collect data about conditions.

Further, the applicable controller(s) 54 can be operably connected to GPS 80. The GPS 80 can be configured to track the position of the planter 10 and/or the position of each or a portion of the seed being planted. In particular, the applicable controller(s) can use GPS to calculate a location where the seed will be planted by the insertion and/or dispersion device. In another embodiment, the seed location of the seed to be planted can be based, at least in part, on manual observation and/or operation of the insertion and/or dispersion device by the farmer. In some embodiments, the farmer can engage a button, switch and/or other device, provide an input to the GUI 76, GPS 80, and/or other input, and/or otherwise signal to the applicable controller(s) 54 and/or component of the planter 10 to apply a particular seed-applied substance and/or otherwise dispense a combination of seed and seed-applied substance(s). Upon instruction from the farmer, one or more insertion and/or dispersion devices can deliver selected combinations of seed and seed-applied substance(s) to be planted. Furthermore, the applicable controller(s) 54 can use seed singulation, GPS 80 and/or other means to determine the prescribed combination of seed and seed-applied substance(s) on a seed-by-seed, row-by-row, column-by-column, zone-by-zone, region-by-region, field-by-field and/or across multiple fields and/or farming operations. Still further, the applicable controller(s) 54 can be operably connected to one or more timing mechanisms 82 and one or more metering mechanisms 50. The applicable controller(s) 54 can control the metering mechanism 50 associated with one or more substance receptacles 56 and/or can adjust the rate of flow of the applicable seed-applied substance(s). In an exemplary example, the applicable metering mechanism(s) 50 can be adjustable, whereby the mechanism can adjust the size of the opening and/or otherwise adjust the amount of the applicable seed-applied substance(s) permitted to enter one or more substance delivery tubes 52. In other exemplary embodiments, the applicable metering mechanism(s) 50 can be adjusted manually by the farmer. The applicable timing mechanism(s) 82 can calculate and/or coordinate the delivery time of the seed-applied substance to one or more substance applicator(s) for one or more seeds at the appropriate point in the seed flow path. As one way to do so, the applicable timing mechanism(s) 82 could calculate a delivery time for the selected seed to travel from the seed receptacle 20 to location(s) of the seed flow path where the applicable application(s) will occur, the delivery time(s) for the selected seed-applied substances to travel through the substance flow path to the applicable substance applicator(s) and/or a delivery time for combination of the seed and seed-applied substance to travel from the applicable portion of the seed flow path to the insertion and/or dispersion device. In some embodiments, the applicable timing mechanism(s) 82 can calculate a delivery time for the seed and/or seed-applied substance from the applicable seed receptacle 20 and/or substance receptacle 38, respectively, to any other component within the seed flow path and/or substance flow path, respectively. As previously discussed herein, many different components are possible, but can include one or more seed delivery tubes 52, seed hoppers 24, seed meters 26, and/or seed drop tubes 28. In an exemplary embodiment, the applicable timing mechanism(s) 82 can be synchronized with the delivery of the seed to the insertion and/or dispersion device.

Using GPS 80, the applicable controller(s) 54 can perform the step 84 of determining the location of the planter 10 and/or the seed planting location. At any given seed location, the applicable controller(s) can perform 54 the step 86 of determining whether one or more seed-applied substance(s) are required. Using the above example, if the planter 10 is positioned in the portion of the field where nitrogen levels are adequate for the applicable crop, the applicable controller(s) 54 can proceed in the negative and performs the step 88 of dispensing the seed to the seed location. If the planter 10 is positioned in the portion of the field with nitrogen deficiency (e.g., the applicable sensor(s) 78 measure or predict a nitrogen deficiency), the applicable controller(s) 54 can perform the step 90 of determining the type and/or amount of seed-applied substance to apply to the seed for the applicable seed planting location. In this particular example of nitrogen deficiency, the type of substance could be one or more nitrogen fixing bacteria (e.g., *Azospirillum brasilense, brady rhizobium*, etc.). The amount and number of seed-applied substance(s) can be based, at least in part, on the extent of the condition (e.g., level of nitrogen deficiency). In an exemplary embodiment, the applicable controller(s) 54 can be programmed with predetermined rates with which to apply specific seed-applied substances (e.g., how much of a particular active ingredient and/or mixture) based at least in part on the applicable condition(s). For example, the applicable controller(s) 54 could determine whether to apply a low rate, mid-rate and/or high rate of the applicable seed-applied substance(s) to the seed based at least in part on the applicable condition(s).

In some situations, more than one different type of seed-applied substance may be prescribed for applications to one or more particular seeds. In such situations, the same process could take place for all of the applicable seed-applied substances. Additionally, if a mixer and/or multiple substance applicators are used, the applicable controller(s) could control the mixing of the applicable seed-applied substances within the mixer, and the applicable timing mechanism(s) 82 would need to take into consideration these additional steps.

The applicable controller(s) 54 can perform the step 92 of applying the seed-applied substance to the seed during the planting operation. As one way to do so, the applicable controller(s) 54 could operably control the applicable metering mechanism(s) 50 and timing mechanism(s) 82 consistent with the present disclosure previously expressed herein. The step 92 of applying the seed-applied substance can be performed by any of the methods and/or just prior to the seed entering, within, as the seed leaves, and/or otherwise proximate to any of the components previously expressed herein. The applicable controller(s) 54 can perform the step 94 of dispensing the combination of seed and seed-applied substance to the seed location in numerous ways, including those previously expressed herein.

Figure 11:
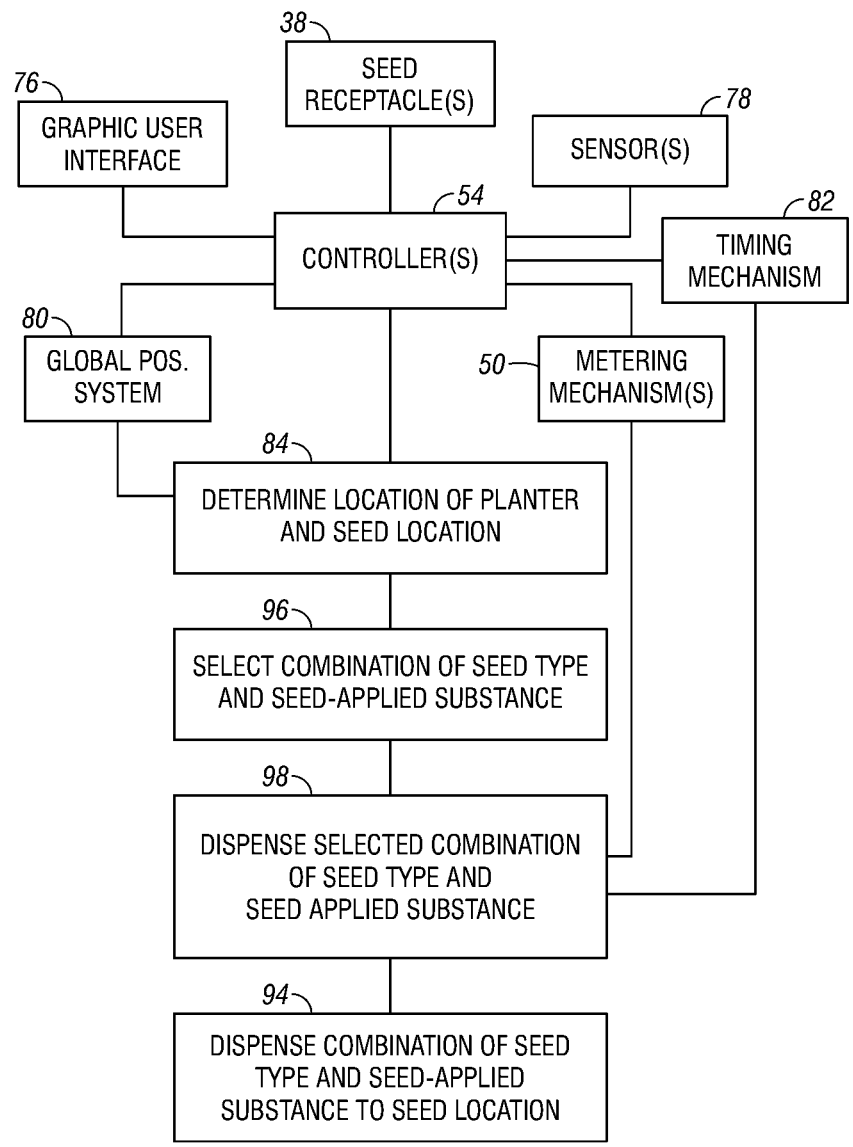
FIG. 11 is a block diagram providing a pictorial representation for a method of operation of a planter implement system in accordance with an illustrative embodiment.

FIG. 11 illustrates another exemplary method for performing some of the objects of the present disclosure. Similar to the exemplary embodiment illustrated in FIG. 10, one or more controllers 54 can be operably connected to the applicable GUI's 76, sensor(s) 78, global positioning system(s) 80, timing mechanism(s) 82, and metering mechanism(s) 50. Further, the applicable controller(s) 54, and more particularly the applicable metering mechanism(s) 50, can be operably connected to the applicable seed receptacle(s) 38. In the exemplary embodiment illustrated in FIG. 11, however, seeds can be treated with one or more seed-applied substance(s) before loading into a plurality of seed receptacles 38 and/or one or more partitioned seed receptacles 20, and one or more seed receptacle(s) and/or partitions of seed receptacles 38 can contain the different combinations of seed and seed-applied substances.

The applicable controller(s) 54 can perform the step 84 of determining the location of the planter 10 and/or the seed planting location. Based at least in part on one or more conditions discussed above, including, for example, those input by the farmer and/or otherwise, and/or through the applicable GUI's 76 and/or measured by the applicable sensor(s) 78, the applicable controller(s) 54 can perform the step of 96 selecting a combination of seed and seed-applied substance. In the foregoing example involving nitrogen deficiency, the farmer could have proactively pre-loaded the planter with at least one hybrid with improved NUE native and/or transgenic traits and/or nitrogen fixing bacteria and/or biological already applied. Further, the farmer could have proactively pre-loaded the planter with at least one hybrid without such improved NUE native and/or transgenic traits and/or nitrogen fixing bacteria and/or biological already applied. If a particular seed location is associated with the nitrogen deficiency, the applicable controller 54 could select the combination of seed type and seed-applied substance(s) comprising one of the hybrids with improved NUE native and/or transgenic traits and/or nitrogen fixing bacteria and/or biological already applied from the different combinations of seed and seed-applied substance(s) contained in one or more seed receptacles 38 and/or cause the seed receptacle 38 to deliver the applicable combination of seed and seed-applied substance(s). Similarly, if a particular seed location is one where nitrogen levels are adequate for the applicable crop, the applicable controller 54 could select the above combination of seed type and seed-applied substance(s) comprising one of the hybrids without improved NUE native and/or transgenic traits and/or nitrogen fixing bacteria and/or biological already applied and/or the seed receptacle 38 to deliver the applicable combination of seed and seed-applied substance(s). The applicable controller(s) 54 can cause the selected seed receptacle 38 to dispense the selected combination of seed type and seed-applied substance(s) and/or deliver it to the insertion and/or dispersion device. The applicable metering mechanism(s) 50 can be operably connected to the applicable seed receptacles 38 to perform the step 98 of dispensing the selected combination seed type and seed-applied substance(s). The applicable controller(s) 54 can thus perform the step 94 of dispensing the selected combination of seed type and seed-applied substance to the seed location.

The disclosure is not to be limited to the particular embodiments described herein. In particular, the disclosure contemplates numerous variations in the type of ways in which embodiments of the disclosure can be applied to a prescriptive seed treatment and method. The foregoing description has been presented for purposes of illustration and description. It is not intended to be an exhaustive list and/or limit any of the disclosure to the precise forms disclosed. It is contemplated that other alternatives and/or exemplary aspects that are considered included in the disclosure. The description is merely examples of embodiments, processes and/or methods of the disclosure. It is understood that any other modifications, substitutions, and/or additions can be made, which are within the intended spirit and scope of the disclosure. For the foregoing, it can be seen that the disclosure accomplishes at least all that is intended.

The previous detailed description is of a small number of embodiments for implementing the disclosure and is not intended to be limiting in scope. The following claims set forth a number of the embodiments of the disclosure with greater particularity.

What is claimed is:

1. A prescriptive seed treatment method comprising the steps of:
   providing a planter, a seed drop tube, a substance receptacle, a substance applicator, a seed, and a seed-applied substance;
   calculating a location within a field where the seed will be delivered to the soil by the planter;
   selecting, based at least in part on a condition, a combination of the seed and the seed-applied substance by selecting a type of seed-applied substance and calculating a desired application amount of the selected type of the seed-applied substance to be applied to and carried by the seed to the soil;
   generating the combination of the seed and the selected type of the seed-applied substance at least in part by individually applying the desired application amount of the selected type of the seed-applied substance to each seed as it is being delivered to the soil
   and
   delivering the combination of the seed and the selected type of the seed-applied substance to the soil at the calculated location within the field for planting;
   wherein the type of the seed-applied substance and the desired application amount of the selected type of the seed-applied substance can vary as the planter changes locations within the field.

2. The method of claim 1 wherein the step of selecting, based at least in part on the condition, the combination of seed and seed-applied substance further comprises selecting a seed type.

3. The method of claim 1 wherein the combination of seed and the selected type of the seed-applied substance varies based at least in part on one of the following: a type of the seed, the type of the seed-applied substance, and an application rate of the seed-applied substance.

4. The method of claim 1 wherein a controller can be used to calculate the location where the seed will be delivered to the soil, select, based at least in part on the condition, the combination of seed and seed-applied substance to plant at the location, generate the combination of the seed and the selected type of the seed-applied substance, or plant the combination of seed and the selected type of the seed-applied substance.

5. The method of claim 1 wherein the selected type of the seed-applied substance is applied to the seed proximate to the seed drop tube.

6. The method of claim 1 wherein the substance applicator comprises a nozzle to spray the selected type of the seed-applied substance onto the seed as the seed is delivered to the soil.

7. The method of claim 1 wherein the step of generating the combination of the seed and the selected type of the seed-applied substance further comprises:
   providing a metering device; and
   metering an amount of the selected type of the seed-applied substance from the substance receptacle through a substance flow path to the substance applicator with the metering device.

8. The method of claim 1 wherein the step of generating the combination of the seed and the selected type of the seed-applied substance further comprises:
   providing a timing mechanism; and
   calculating, with the timing mechanism, both delivery time of the selected type of the seed-applied substance from the substance receptacle through a substance flow path to the substance applicator and travel time of the seed through a seed flow path.

9. The method of claim 1 further comprising the steps of:
   providing a mixer in fluid communication with the substance receptacle and a substance flow path; and
   mixing the seed-applied substance prior to the selected type of the seed-applied substance being applied to the seed.

10. The method of claim 1 further comprising the step of:
    adjusting a mixture ratio of the seed-applied substance during operation of the planter.

11. The method of claim 1 wherein the substance applicator is associated with at least one of:
    a. a mixer in fluid communication with the substance receptacle and a substance flow path;
    b. a seed hopper configured to receive the seed from a seed receptacle;
    C. a seed meter configured to receive the seed from the seed hopper and further transfer it through a seed flow path; and
    d. the seed drop tube.

12. The method of claim 1 further comprising the steps of:
    transferring the seed into the seed drop tube; and
    applying the selected type of the seed-applied substance to the seed proximate to or within the seed drop tube.

13. The method of claim 1 wherein the desired application amount of the selected type of the seed-applied substance to be applied to the seed is either:

always the same amount of seed-applied substance; or
only either one specific amount of seed-applied substance or no amount of the seed-applied substance.

14. The method of claim 1, wherein the type of the seed-applied substance and the desired application amount of the selected type of the seed-applied substance can vary as the planter changes location within the field by changing the type, number or amount of one or more of the seed-applied substances applied to the seed when generating the combination of the seed and the seed-applied substance.

15. The method of claim 1, wherein the combination of seed and the selected type of the seed-applied substance can vary based at least in part upon a seed-applied substance type, a number of seed-applied substances, or the desired application amount of one or more of the selected type of seed-applied substance.

16. The method of claim 1, wherein the combination of seed and the selected type of the seed-applied substance can vary based at least in part upon a seed type.

17. The method of claim 1, wherein the seed drop tube comprises an air tube.

18. The method of claim 1, wherein the seed drop tube comprises a brush tube.

19. The method of claim 1, wherein the seed drop tube comprises a seed accelerator.

* * * * *